US006766255B2

(12) United States Patent
Stone

(10) Patent No.: US 6,766,255 B2
(45) Date of Patent: Jul. 20, 2004

(54) METHOD OF DETERMINING SUBSIDENCE IN A RESERVOIR

(75) Inventor: Terry Wayne Stone, Kingsworthy (GB)

(73) Assignee: Schlumberger Technology Corporation, Houston, TX (US)

(*) Notice: Subject to any disclaimer, the term of this patent is extended or adjusted under 35 U.S.C. 154(b) by 134 days.

(21) Appl. No.: 10/070,510

(22) PCT Filed: Jul. 6, 2001

(86) PCT No.: PCT/GB01/03042
§ 371 (c)(1),
(2), (4) Date: Aug. 15, 2002

(87) PCT Pub. No.: WO02/06857
PCT Pub. Date: Jan. 24, 2002

(65) Prior Publication Data
US 2003/0078733 A1 Apr. 24, 2003

(30) Foreign Application Priority Data
Jul. 14, 2000 (GB) ............................................. 0017227

(51) Int. Cl.[7] .......................... G06F 19/00; E21B 47/00
(52) U.S. Cl. ...................................... 702/13; 73/152.01
(58) Field of Search ................................ 702/13, 2, 14; 73/152.01; 703/5

(56) References Cited

PUBLICATIONS

Cassiani et al., Gas Extraction and Risk of Subsidence: the Case of the Northern Adriatic Gas Fields, Technical Issues, 1998, SPE 46808.*
Burbey, T., State of Subsidence Modeling Within the U.S. Geological Survey, Feb. 14–16, 1995, U.S. Geological Survey Subsidence Interest Group Conference, Las Vegas, Nevada.*
IBM Technical Disclosure Bulletin, Mathematical Model of Subsoil Relevant of Subsidence, Apr. 1971, vol. 13, Issue No. 11, pp. 3206–3210.*

* cited by examiner

Primary Examiner—John Barlow
Assistant Examiner—Toan M. Le
(74) Attorney, Agent, or Firm—Schlumberger Technology Corporation

(57) ABSTRACT

A reservoir simulator first estimates rock displacement parameters (u, v, and w) representing rock movement in the x, y, and z directions. When the rock displacement parameters (u, v, w) are determined, "$\epsilon_{x,y,z}$" (the 'x,y,z elongation strains') and "$\gamma_{xy,yz,zx}$" (the 'shear strains') are determined since "$\epsilon_{x,y,z}$" and "$\gamma_{xy,yz,zx}$" are function of "u", "v", and "w". When "$\epsilon_{x,y,z}$" and "$\gamma_{xy,yz,zx}$" are determined, "$\sigma_{x,y,z}$" (the 'elastic normal rock stress in x,y,z directions') and "$\tau_{xy,yz,zx}$" (the 'elastic shear stress') are determined since "$\sigma_{x,y,z}$" and "$\tau_{xy,yz,zx}$" are a function of "$\epsilon_{x,y,z}$" and "$\gamma_{xy,yz,zx}$". When "$\sigma_{x,y,z}$" and "$\tau_{xy,yz,zx}$" are determined, the rock momentum balance differential equations can be solved, since these equations are a function of "$\sigma_{x,y,z}$" and "$\tau_{xy,yz,zx}$". When any residuals are substantially equal to zero, the estimated rock displacement parameters (u, v, and w) will represent 'accurate rock displacement parameters' for the reservoir. When the rock momentum balance differential equations are solved, the rock displacement parameters (u, v, w), at an advanced time, are known. These rock displacement parameters (u, v, w) represent and characterize a 'subsidence' in a seabed floor because subsidence will result from rock movement; and rock movement will result from a continual withdrawal of oil or other hydrocarbon deposits or other fluids such as water over a period of time from an Earth formation. This 'abstract of the disclosure' is given for the sole purpose of allowing a patent searcher to easily determine the content of the disclosure in this application.

12 Claims, 16 Drawing Sheets

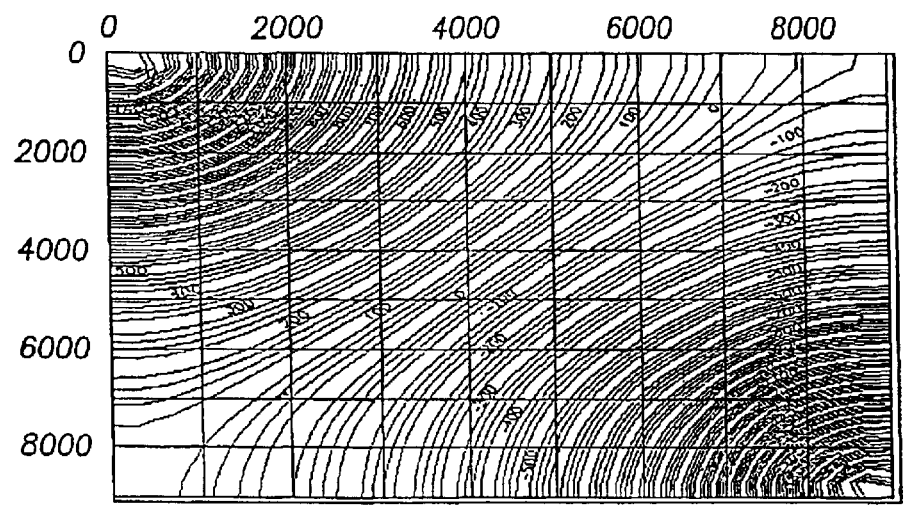
FIG.4a1
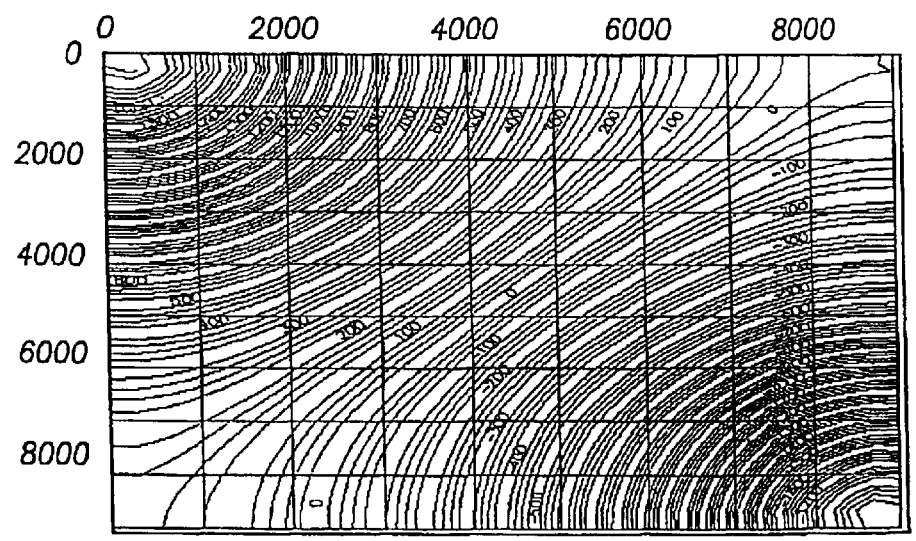
FIG.4a2

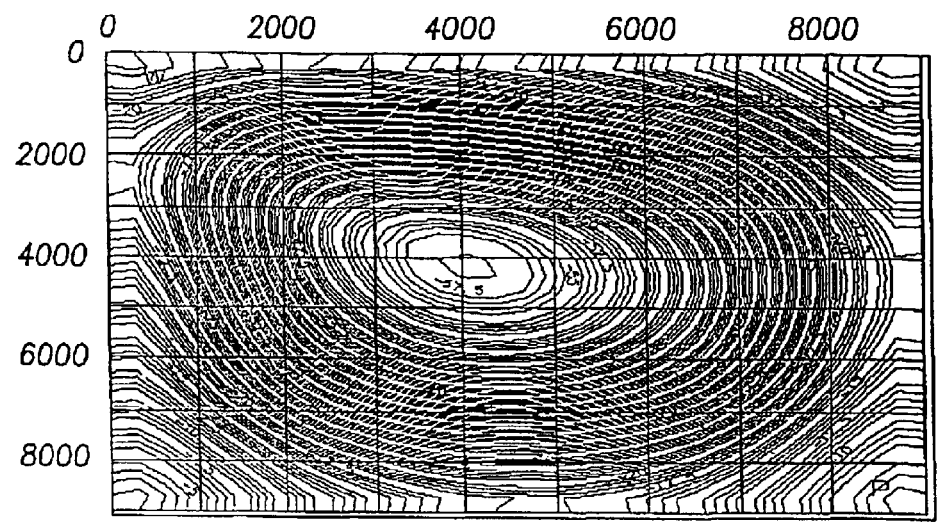
FIG.4b1
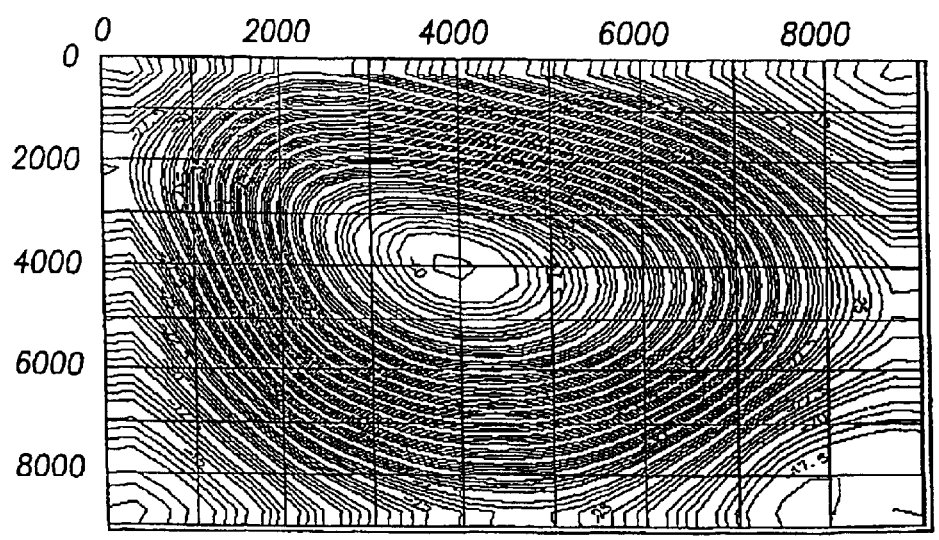
FIG.4b2

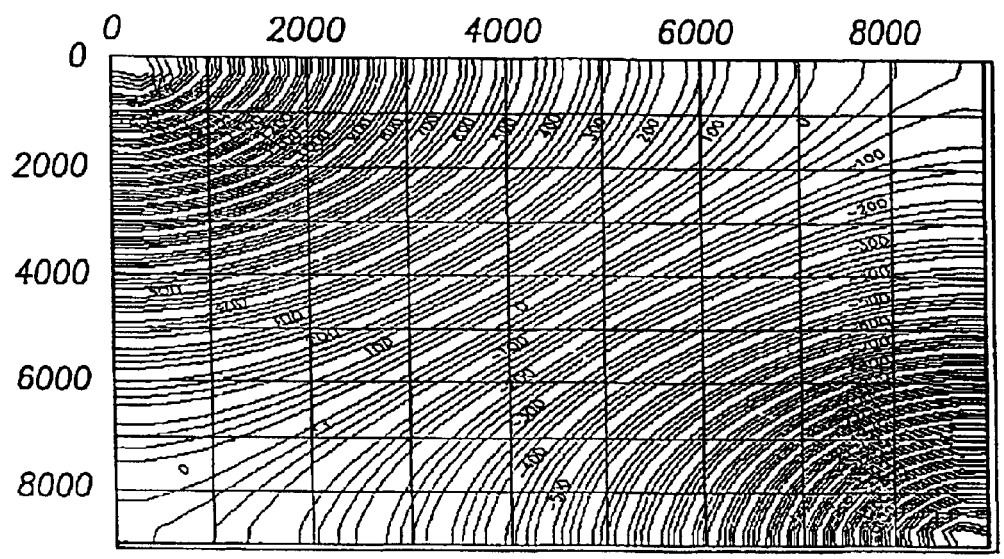
FIG.4c1
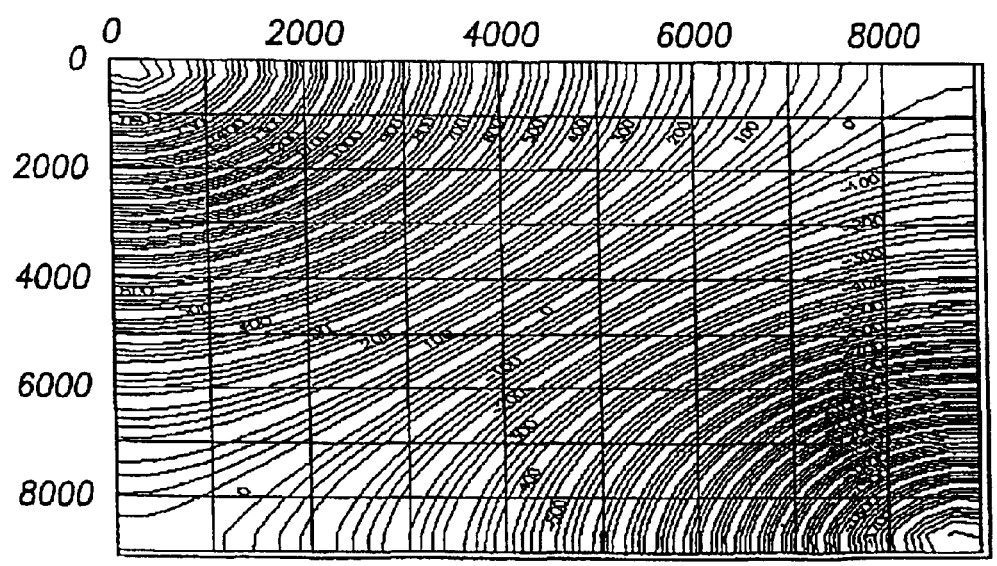
FIG.4c2

| SIMULATION PARAMETERS USED IN COMPARING ABAQUS AND RESERVOIR SIMULATOR PREDICTIONS | | | |
|---|---|---|---|
| CASE | GRID DIMENSIONS | YOUNG'S MODULUS | POISSON'S RATIO |
| 1 | 9x1x1 | 10 GPa | 0.4 |
| 2 | 9x1x1 | .1 GPa | 0.3 |
| 3 | 4x1x3 | 10 GPa | 0.4 |
| 4 | 4x1x3 | .1 GPa | 0.3 |
| 5 | 9x1x3 | 10 GPa | 0.4 |
| 6 | 9x1x3 | .1 GPa | 0.3 |

METHOD OF DETERMINING SUBSIDENCE IN A RESERVOIR

BACKGROUND OF THE INVENTION

The subject matter of the present invention relates to a reservoir simulator including a parameter determination software which determines displacement parameters representing subsidence in an oilfield reservoir.

There are many recent reports of geomechanical modelling being used predictively for evaluation of alternative reservoir development plans. In the South Belridge field, Kern County, Calif., Hansen et al[1] calibrated finite-element models of depletion-induced reservoir compaction and surface subsidence with observed measurements. The stress model was then used predictively to develop strategies to minimise additional subsidence and fissuring as well as to reduce axial compressive type casing damage. Berumen et al[2] developed an overall geomechanical model of the Wilcox sands in the Arcabuz-Culebra field in the Burgos Basin, northern Mexico. This model, combined with hydraulic fracture mapping together with fracture and reservoir engineering studies, was used to optimise fracture treatment designs and improve the planning of well location and spacing.

The subject of fluid flow equations which are solved together with rock force balance equations has been discussed extensively in the literature. Kojic and Cheatham[3,4] present a lucid treatment of the theory of plasticity of porous media with fluid flow. Both the elastic and plastic deformation of the porous medium containing a moving fluid is analyzed as a motion of a solid-fluid mixture. Corapcioglu and Bear[5] present an early review of land subsidence modelling and then present a model of land subsidence as a result of pumping from an artesian aquifer. Demirdzic et al[6,7] have advocated the use of finite volume methods for numerical solution of the stress equations both in complex domains as well as for thermo-elastic-plastic problems.

A coupling of a conventional stress-analysis code with a standard finite difference reservoir simulator is outlined by Settari and Walters[8]. The term "partial coupling" is used because the rock stress and flow equations are solved separately for each time increment. Pressure and temperature changes as calculated in the reservoir simulator are passed to the geomechanical simulator. Updated strains and stresses are passed to the reservoir simulator which then computes porosity and permeability. Issues such as sand production, subsidence, compaction that influence rock mass conservation are handled in the stress-analysis code. This method will solve the problem as rigorously as a fully coupled (simultaneous) solution if iterated to full convergence. An explicit coupling, i.e. a single iteration of the stress model, is advocated for computational efficiency.

The use of a finite element stress simulator with a coupled fluid flow option is discussed by Heffer et al[9] and by Gutierrez and Lewis[10].

Standard commercial reservoir simulators use a single scalar parameter, the pore compressibility, as discussed by Geertsma[11] to account for the pressure changes due to volumetric changes in the rock. These codes generally allow permeability to be modified as a function of pore pressure through a table. This approach will not be adequate when the flow parameters exhibit a significant variation with rock stress. Holt[12] found that for a weak sandstone, permeability reduction was more pronounced under non-hydrostatic applied stress, compared with the slight decrease measured under hydrostatic loading. Rhett and Teufel[13] have shown a rapid decline in matrix permeability with increase in effective stress. Ferfera et al[14] worked with a 20% porosity sandstone and found permeability reductions as high as 60% depending on the relative influence of the mean effective stress and the differential stress. Teufel et al[15] and Teufel and Rhett[16] found, contrary to the assumption that permeability will decrease with reservoir compaction and porosity reduction, that shear failure had a beneficial influence on production through an increase in the fracture density.

SUMMARY OF THE INVENTION

Oil recovery operations are seeing increased use of integrated geomechanical and reservoir engineering to help manage fields. This trend is partly a result of newer, more sophisticated measurements that are demonstrating that variations in reservoir deliverability are related to interactions between changing fluid pressures, rock stresses and flow parameters such as permeability. Several recent studies, for example, have used finite-element models of the rock stress to complement the standard reservoir simulation.

This specification discusses current work pertaining to: fully and partially coupling geomechanical elastic/plastic rock stress equations to a commercial reservoir simulator. This finite difference simulator has black-oil, compositional and thermal modes and all of these are available with the geomechanics option. In this specification, the implementation of the aforementioned stress equations into the code, hereinafter called the 'Parameter Determination Software', is discussed. Some work on benchmarking against an industry standard stress code is also shown as well as an example of the coupled stress/fluid flow. The goal in developing this technology within the simulator is to provide a stable, comprehensive geomechanical option that is practical for large-scale reservoir simulation.

Further scope of applicability of the present invention will become apparent from the detailed description presented hereinafter. It should be understood, however, that the detailed description and the specific examples, while representing a preferred embodiment of the present invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein:

FIGS. 4a1, 4a2, 4b1, 4b2, 4c1, and 4c2 illustrate total normal stress in Mid X-Y plane;

DESCRIPTION OF THE INVENTION

Elastic Stress Equations

Steady state "rock momentum balance equations" in the x, y and z directions can be written as[17]:

$$\frac{\partial \sigma_x}{\partial x} + \frac{\partial \tau_{yx}}{\partial y} + \frac{\partial \tau_{zx}}{\partial z} + F_x + P_x = 0 \quad (1)$$

$$\frac{\partial \sigma_y}{\partial y} + \frac{\partial \tau_{xy}}{\partial x} + \frac{\partial \tau_{zy}}{\partial z} + F_y + P_y = 0$$

$$\frac{\partial \sigma_z}{\partial z} + \frac{\partial \tau_{xz}}{\partial x} + \frac{\partial \tau_{yz}}{\partial y} + F_z + P_z = 0.$$

Here $\overline{F}$ is the body force, $\overline{P}$ is the interaction force between the solid and the fluid. This interaction force is discussed further below.

The elastic normal stresses σ and shear stresses τ can be expressed in terms of strains, ε and γ, as:

$$\sigma_x = 2G\epsilon_x + \lambda(\epsilon_x + \epsilon_y + \epsilon_z)$$

$$\sigma_y = 2G\epsilon_y + \lambda(\epsilon_x + \epsilon_y + \epsilon_z)$$

$$\sigma_z = 2G\epsilon_z + \lambda(\epsilon_x + \epsilon_y + \epsilon_z)$$

$$\tau_{xy} = G\gamma_{xy}$$

$$\tau_{yz} = G\gamma_{yz}$$

$$\tau_{zx} = G\gamma_{zx} \quad (2)$$

Constants G, also known as the modulus of rigidity, and λ are Lamé's constants. They are functions of Young's modulus, E, and Poisson's ratio, ν. Strains $\epsilon_{x,y,z}$ are defined in terms of displacements in the x,y,z directions, namely u, v and w. Thus $$\epsilon_x = \frac{\partial u}{\partial x} \quad (3)$$

$$\epsilon_y = \frac{\partial v}{\partial y}$$

$$\epsilon_z = \frac{\partial w}{\partial z}$$

$$\gamma_{xy} = \frac{\partial u}{\partial y} + \frac{\partial v}{\partial x}$$

$$\gamma_{yz} = \frac{\partial v}{\partial z} + \frac{\partial w}{\partial y}$$

$$\gamma_{zx} = \frac{\partial w}{\partial x} + \frac{\partial u}{\partial z}$$

Within the simulator, the rock force is calculated in units of Newtons, lbf, or dynes depending on whether the user has chosen mks, field or cgs units for the simulation.

Gridding

Before returning to a discussion of the fluid component mass conservation and rock mass conservation equations, the special gridding for the rock force (momentum) balance equations is briefly outlined.

To implement these rock momentum balance equations in a finite difference simulator, separate control volumes for balancing the force are used in each orthogonal grid direction. These control volumes are staggered in each of the coordinate directions.

Figure 1:
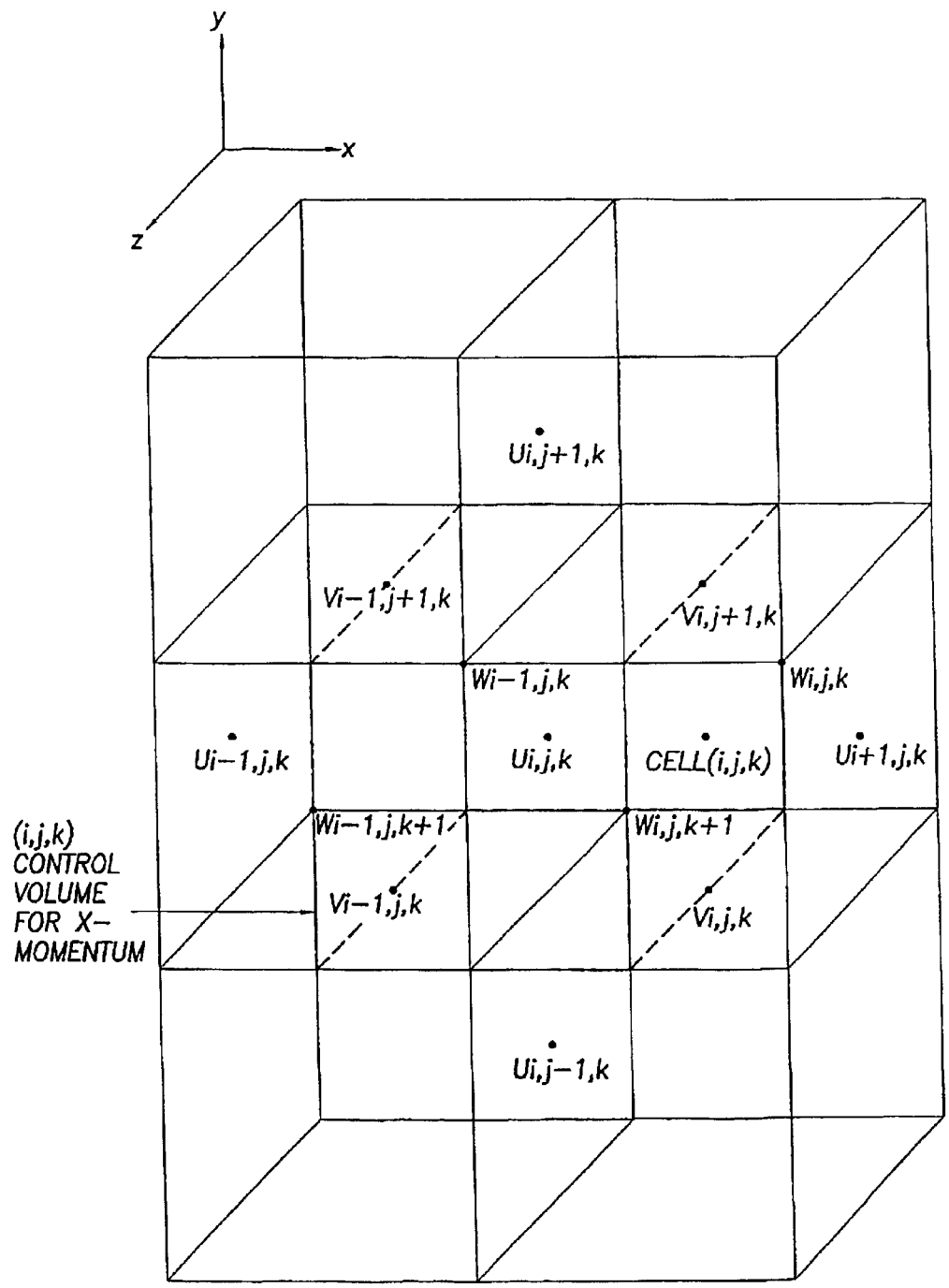
FIG. 1 illustrates control volume (light grey grid) for Rock Force Balance.

In FIG. 1, an x-direction rock force balance control volume is shown. Also shown in this Figure is the finite difference discretization used. The grid with the darker black lines in this figure is the standard reservoir simulation grid which are control volumes for fluid component and rock mass conservation. Rock displacements u, v and w are defined on the faces of this grid. Rock momentum control volumes in a particular coordinate direction are centred on the rock displacement in that direction. In FIG. 1 is shown the x-momentum control volume (light grey grid) in the centre of which is the x-direction rock displacement, u, which is defined on the face between two control volumes for mass conservation (black grid). Similar rock momentum control volumes are set up in the y and z directions around v and w, the y and z rock displacements.

This grid is fixed in time. Rock will flow elastically or plastically in the mass conservation grid. A correction term to Darcy's law that accounts for the extra transport of fluid component mass into an adjoining mass conservation cell due to rock movement into that cell can be calculated in the simulator and is discussed below.

We have found the staggered gridding to be the most natural for differencing purposes and for setting of boundary conditions. It is also the most accurate because it achieves second order accuracy when calculating the normal stresses and mixed first/second order accuracy when calculating the shear stresses. To illustrate, if the user has input the more general stiffness matrix[18], $\overline{\overline{S}}_N$, instead of the Young's moduli and Poisson ratios, then the differenced normal stress on the x+ side of the rock momentum balance control volume in FIG. 1 can be written $$\sigma_{z+} = S_{N_{xzy+}} \cdot \varepsilon_{x_{y+}} + S_{N_{xy}} \cdot \varepsilon_{y_{z+}} + S_{N_{xz}} \cdot \varepsilon_{z_{x+}} \quad (4)$$

$$\varepsilon_{x_{y+}} = \frac{u_{i+1,j,k} - u_{i,j,k}}{\Delta x_{i,j,k}}$$

$$\varepsilon_{y_{z+}} = \frac{v_{i,j+1,k} - v_{i,j,k}}{\Delta y_{i,j,k}}$$

$$\varepsilon_{z_{x+}} = \frac{w_{i,j,k+1} - w_{i,j,k}}{\Delta z_{i,j,k}}$$

Another consequence of the staggered gridding is that the force balance equations (1) give rise to a thirteen-banded jacobian for three-dimensional calculations. In addition to the standard diagonal and six off-diagonal bands, there are six more connecting points in the differencing stencil which contribute the other bands.

Fluid Component Conservation, Rock Mass Conservation and Volume Balance Equations Compositional and thermal simulation require the user to specify the number of fluid components. Fluid components are conserved in the standard user-specified grid blocks as noted above. Rock also flows either elastically or plastically, in addition to fluid, amongst these grid cells. A rock mass conservation equation can be written in pseudo-differenced form as:

$$V \cdot \rho_{rock} \cdot \lfloor (1-\varphi)^{n+1} - (1-\phi)^n \rfloor = \sum_{faces} A_{face} \cdot (u, v, w_{face}^{n+1} - u, v, w_{face}^n) \cdot (\rho_{rock} \cdot (1-\varphi)^{n+1})^{up} \quad (5)$$

where

V=bulk volume of the rock mass conservation cell
$\rho_{rock}$=specific density of rock
$\phi$=porosity of rock (variable)
u,v,w=x,y,z total rock displacement Superscripts n+1, n refer to the time level −n refers to the last time step, n+1 refers to the current or latest time level. The superscript "up" refers to the upstream of the rock displacement change over the time step. Flow of rock into an adjoining cell originates from the cell away from which rock flows during the timestep, as denoted by $u,v,w_{face}^{n+1} - u,v, w_{face}^n$ in the above equation (5). Total rock displacement is the sum of elastic and plastic rock displacement. The elastic rock displacements in the coordinate directions and porosity are included in the simulator variable set. Rock properties, for example relative permeability endpoints, are convected.

Fluid component mass conservation assumes the usual form and is discussed elsewhere[19,20].

In order that the fluid volumes fit into the available pore volume, a final fluid phase volume balance equation is included. It is often written as the sum of fluid phase saturations (volume of fluid divided by pore volume) equal to unity.

Additional Enhancements to the Balance Equations

A term that describes the change of rock momentum in time, namely $$n1_{rock} \frac{\partial^2 u}{\partial t^2},$$

where $n1_{rock}$ is the mass of rock in the rock balance grid cell, can also optionally be switched on by the user. By default it is omitted because this term is small and makes little contribution to the force balance. Also, when it is not specified, wave solutions of the form f(x±ct) are not calculated where c is some characteristic rock compression/shear velocity. These wavelets may cause instability and usually are of little interest over standard simulation time scales.

Secondly, as discussed by Corapcioglu and Bear[5], in a deforming porous medium it is the specific discharge relative to the moving solid, $q_r$, that is expressed by Darcy's law $$q_r = q - \phi V_s = -K \cdot \nabla H \quad (6)$$

where q=specific discharge of a fluid component (flux)
$\phi$=porosity
$V_s$=velocity of the solid
K=fluid phase permeability
H=pressure head, including the gravitational head This term is, again, omitted by default but can be included if desired. In problems where the elastic and plastic rock flow is small and near steady state, there is not much contribution from this term. In situations where the pressure field is changing continuously and strongly, for example in a thermal cyclic huff and puff scenario where the near wellbore pressure can vary by more than 500 psi through a short cycle time period, this term can have a strong effect on the simulation. In particular, it can reduce the unphysically high injection pressures normally predicted by a conventional simulator. There is an additional CPU expense associated with this term since it can add one or more newton iterations to a timestep.

Interaction Between the Fluid and the Rock

The interactive force between the fluid and solid, denoted $\bar{P}$ in equation (1), can be expressed in the form[5]

$$\bar{P} = \bar{F}_f^{in} + \phi \bar{F}_f + \nabla \cdot \bar{T}_f \quad (7)$$

where $\bar{F}_f^{in}$=inertial force of the fluid per unit bulk volume
$\bar{F}_f$=body force acting on the fluid per unit fluid volume
$\bar{T}_f$=stress tensor of the fluid The stress tensor of the fluid can be related to the pore fluid pressure, following Terzaghi's[21] concept of intergranular stress, $$\bar{T}_f = -p\bar{I} \quad (8)$$

where $\bar{I}$ is the unit tensor. We neglect the effect of the inertial forces of the fluid and write the interaction force as $$\bar{P} = -\nabla p + \phi \bar{F}_f \quad (9)$$

The pore pressures are calculated at the centres of the mass conservation cells so that the pore pressure gradient in equation (9), $\nabla p$, is centred in the rock momentum conservation control volume as it should be.

Interaction of the rock stress on flow parameters, in particular fluid permeability, is a subject that is the topic of much current research. As noted above in the introduction, many authors are now carrying out triaxial compression tests on core and rock samples in which fluid is flowing in the stressed rock matrix. Most commercial reservoir simulators contain permeability or transmissibility modifiers as a function of fluid pore pressure. This feature was used in a geomechanics simulation study by Davies and Davies[22] where the relationship between stress and permeability was calculated based on the relationship between the stress and porosity, and between permeability and porosity for various rock types. Yale and Crawford[23] discuss the work of Holt[12], Teufel and Rhett[13,15,16] and others. They also used critical state theory to model observed stress-permeability experimental data. It was concluded that this theory did well represent the observed data.

We are currently exploring several constitutive relationships between stress and permeability. A mean effective stress versus permeability is one of these relationships, another is the classical permeability-porosity. Another possibility is permeability versus $\sigma_1-\sigma_3$, the difference between the maximum and minimum principal stresses, as displayed on the web by GFZ-Potsdam[24]. The success of the critical state theory as discussed in the above paragraph is also of interest.

Variables and Solution of the Equations

We solve for moles of all fluid components per unit pore volume, energy per unit bulk volume if thermal simulation is specified, pressure of one of the fluid phases, elastic rock displacements in the x,y,z directions and porosity. Some of these variables are eliminated before entering the solver. In particular, one of the fluid molar densities is eliminated using the volume balance equation. Usually, a fully implicit solution of all equations is unnecessary because in many parts of the grid the fluid throughput in a mass conservation grid cell is not high. In this case an adaptive implicit solution of the equation set is used in which some of the grid blocks are solved fully implicitly, while others are solved using the IMPES (implicit pressure, explicit saturation) solution scheme. Often the IMPES scheme is used everywhere although the timestepping of this particular scheme is then limited by the throughput. The rock force balance equations are always solved fully implicitly, even in grid cells which are IMPES.

The linear solver used to solve the coupled system of non-linear equations is a nested factorization technique[25]. One such linear solver is disclosed in U.S. Pat. No. 6,230,101 to Wallis, the disclosure of which is incorporated by reference into this specification. Although the rock stress equations (1) are nonlinear because of the implicit porosity and highly elliptic and, in addition, are placed next to mass conservation equations which display both hyperbolic and parabolic form in the jacobian, the solver has demonstrated good robustness in solving the coupled system of equations.

Although some authors[8,26] have described fully or partially coupled schemes where porosity is calculated directly using rock dilation, $\epsilon_x+\epsilon_y+\epsilon_z$, we have chosen the additional rock conservation equation for two reasons. Firstly, the approach is more general and allows rock to be produced in cases of sand fluidization, wellbore instability, etc. Secondly, as discussed further below, at the beginning of a new timestep a large plastic displacement of the rock is accounted for exactly by including it in the implicit rock mass balance for this timestep.

Plasticity

An explicit plastic calculation has been implemented. The Mohr-Coulomb plastic calculation is available. The user can specify the cohesion and angle of internal friction in chosen regions in the grid. At the start of a new timestep, principal stresses are calculated in each rock force-balance control volume based on the stress field from the last timestep. Diameters of the smallest and largest Mohr circles are calculated and the test is made as to whether failure has occurred. If so, the displacement around which the control volume is centred is altered to bring the circle back to the failure envelope. This corrective displacement is stored as a plastic displacement These plastic displacements, which can be referred to as ($u_p$, $v_p$, $w_p$), are part of the total displacements (u, v, w) which in turn are a sum of the elastic and plastic contributions.

Boundary Conditions and Initialisation

Either stress or displacement boundary conditions can be chosen. Each side of the simulation grid, that is x−, x+, y−, y+ and z−, z+, can have one of the above boundary conditions prescribed. Usually the bottom of the grid will have a zero displacement condition while the sides and top will have specified stresses.

Initialisation of a reservoir with stress boundary conditions requires an initial small simulation to equilibrate the simulated field. Before the wells are turned on, boundary stresses are ramped up at intervals until the desired vertical and horizontal stresses are achieved. The pore pressure is maintained at an initial level by including an extra production well with a BHP limit set to this level. Compression of the reservoir by the boundary stresses causes the rock matrix to compress which in turn forces some of the fluid out of this well. Fluid-in-place must be checked before starting the simulation.

User Interface

The user enters a Young's modulus, Poisson ratio and specific rock density for each grid block. It is also possible to input the full stiffness matrix, as illustrated above in equation (4), to allow an anisotropic stress tensor. If a plastic calculation is required, the user enters a cohesion and angle of internal friction in different regions of the grid.

Efficiency of Geomechanical Computations

Because there are several extra equations to be set up and solved, there is a sizable overhead associated with the geomechanics calculation. This overhead is offset by several factors. Firstly, the coupled set of equations is stable and robust Secondly, implementation of the jacobian and right-hand-side setup includes vectorization wherever possible. Also, parallel options exist within the simulator.

On average, for three dimensional IMPES simulations we have noted that run times are about three times as long as the run time needed for the same calculation without geomechanics. This is efficient considering the IMPES calculation only solves a single equation, whereas four additional equations are solved when geomechanics is included. Both the efficiency of setting up the equations and the robustness of the solver contribute to the overall efficiency. The simulator is capable of achieving good parallel speedups and this also helps to offset the increased computational demands.

Benchmarking Against an Industry Standard Stress Code

We have chosen the ABAQUS[27] stress simulator to test the rock stress calculations in our reservoir simulator. ABAQUS was chosen for two reasons. Firstly, it is widely accepted and established. Secondly, it contains a simple, single-phase flow-in-porous-media option.

Two elastic, one-dimensional problems were designed and run in both simulators. The test cases differed only in that one featured an average sandstone, the other a weak sandstone. They were designed to have large pore pressure gradients so that the fluid-rock interaction was pronounced.

Figures 4D, 5:
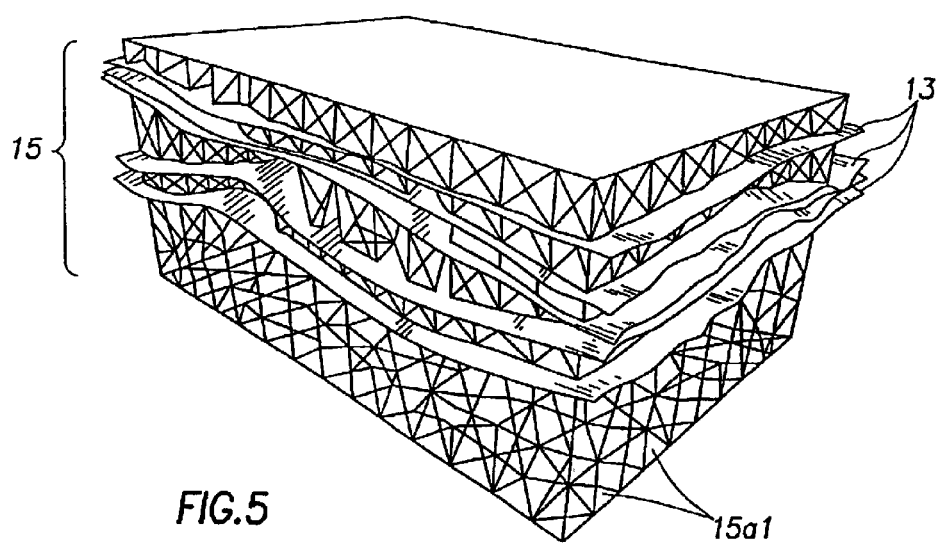
FIG. 4d illustrates Table 1, and Table 1 further illustrates simulation parameters used in comparing ABAQUS and Reservoir Simulator Predictions)
FIGS. 5–9 illustrate examples of structured and unstructured grids.

In FIG. 4d, Table 1 presents the simulation parameters used in the test problems. These are listed in the table as Cases 1 and 2. A water injection rate of 1000 BBL/D was used. The injector was situated in one corner, the producer in the far comer. Boundaries were rigid. Dimensions of the grid were chosen as representative of a small pattern of injectors and producers. The reservoir simulator was run to steady state for these cases. In FIG. 4d, under Table 1, in all cases, porosity=0.33, fluid permeability=6 mD, initial pressure=4790 psia, injection/production rate=1000 BBL/D and grid dimensions were 1000 ft×1000 ft×20 f.

Figure 2:
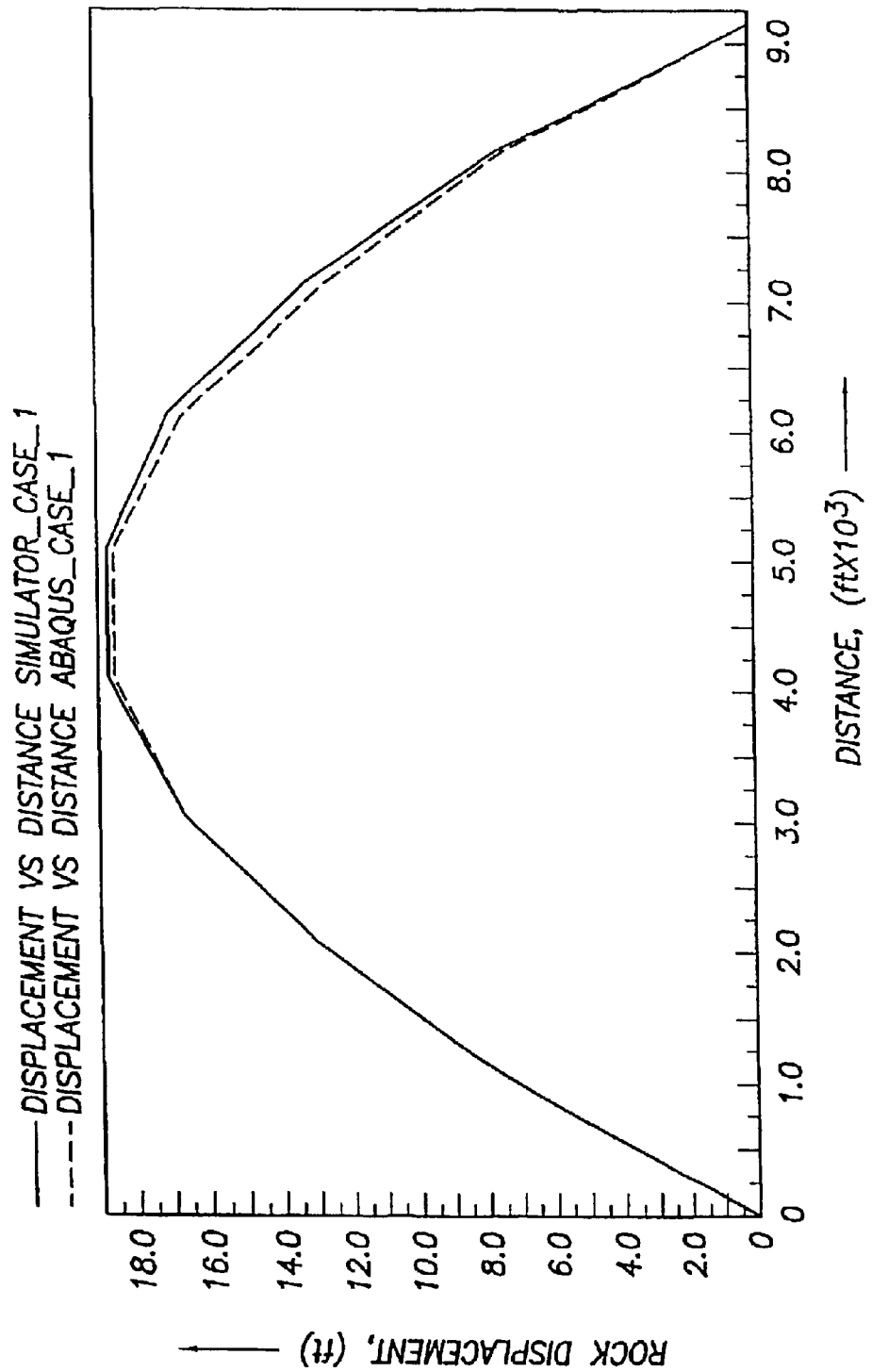
FIG. 2 illustrates comparison of Rock Displacement Predictions (case 1)

In FIG. 2, FIG. 2 shows a comparison of rock displacements as predicted by the two simulators for Case 1, the average strength sandstone.

Figure 3A:
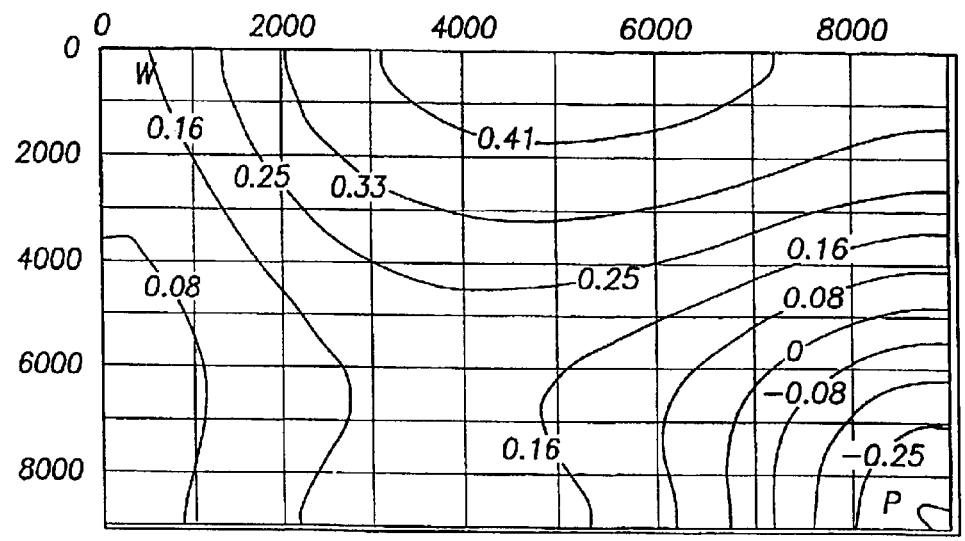
FIGS. 3A and 3B illustrate comparison of Rock Displacement Predictions (case 2)
Figure 3B:
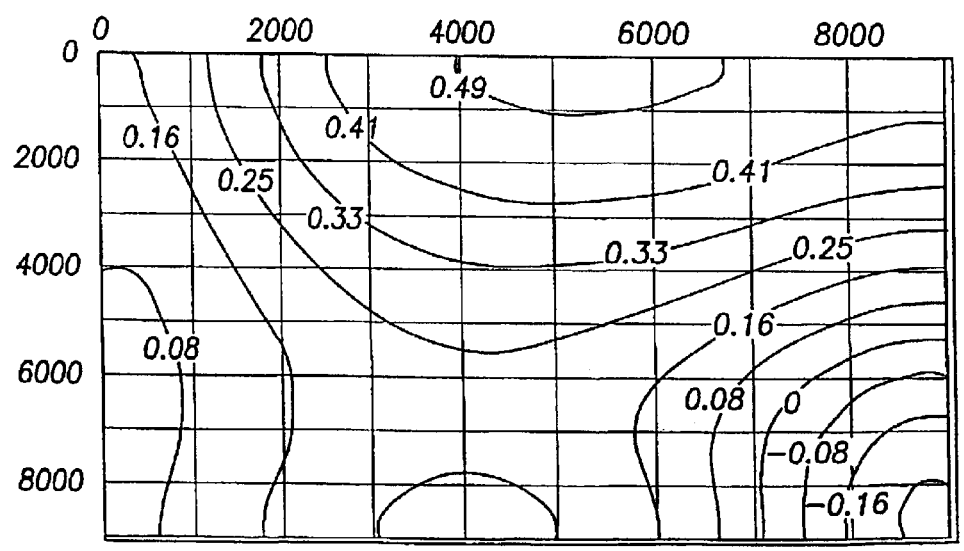

In FIGS. 3A and 3B, these figures illustrate a comparison for the weak rock. Much larger rock displacements are evident as a result of the very low Young's modulus. In both cases, the comparison against ABAQUS was within engineering accuracy.

Other Test Cases

In FIG. 4d, Table 1 is illustrated (Table 1 illustrating simulation parameters used in comparing ABAQUS and Reservoir Simulator Predictions). We have also run ABAQUS on a further set of 4 problems. Table 1, shown in FIG. 4d, lists these as Cases 3 to 6. These are a pair of two-dimensional and a pair of three-dimensional runs. For equilibration purposes; the ABAQUS simulations used boundary conditions that are not available in our reservoir simulator. We are currently working to remedy this. Initial comparisons in which we have approximated the ABAQUS simulation have been encouraging. Both quantitative and qualitative agreement has been achieved.

A plastic case was run in ABAQUS to compare against the reservoir simulator plastic calculation. It is the same as Case 6 in Table 1 of FIG. 4d. A cohesion and angle of internal friction was input to define the Mohr-Coulomb failure curve. Differences in boundary conditions in the two simulators, as discussed above, have prohibited a direct comparison but, again, there is qualitative agreement when comparing plastic displacements. The plastic calculation is robust and timestepping is not adversely affected.

In FIGS. 4a1 and 4a2, 4b1 and 4b2, and 4c1 and 4c2, we have simulated some larger fields with the geomechanics option. An example is shown in FIGS. 4a1 and 4a2. In this three-dimensional, compositional (10 component) problem, 7 injection and 6 production wells contribute to the rock stress. Contours of the total normal stress, $\sigma_x+\sigma_y+\sigma_z$ which is also the first stress invariant, are shown in the mid-xy plane of the simulation. This first stress invariant is important because it largely governs compaction processes. Timestepping with the geomechanics calculation included was the same as without There was a factor of 2.8 slowdown in the overall runtime with geomechanics.

In summary, the implementation of elastic/plastic stress equations into a commercial, finite difference reservoir simulator has been discussed in this specification. Our goal of demonstrating robustness together with a comprehensive geomechanical option has been achieved. Work is continuing to develop this option further. In particular:

1. The coupled system of equations has demonstrated good stability and robustness. In some test cases, there was no difference in timestepping when the simulation was run with or without the geomechanics option.
2. Our current capabilities are comprehensive enough to predict both elastic and plastic rock displacement. The basic design is general enough to allow future engineering development. This could include wellbore stability and failure, sand production, more accurate fault modelling.
3. We have indicated at various points of this paper our areas of current work and investigation. In particular these include stress-permeability relationships and modifying our geomechanical boundary conditions to compare more exactly with ABAQUS. We are also currently working with a large-scale simulation of a very brittle carbonate field to predict subsidence.

Nomenclature

E=Young's modulus
G=modulus of rigidity, Lamé constant
H=pressure head, including the gravitational head
K=fluid phase permeability of rock matrix
q=single phase fluid flux in a porous medium
u=rock displacement in the x direction
v=rock displacement in the y-direction
$V_s$=velocity of the solid, as related to Darcy's law
w=rock displacement in the z-direction
$\sigma_{x,y,z}$=elastic normal rock stress in x,y,z directions
$\epsilon_{x,y,z}$=x,y,z elongation strains
$\gamma_{xy,yz,zx}$=shear strains
$\lambda$=Lamé constant
$\phi$=porosity
$\nu$=Poisson's ratio
$\rho_{rock}$=rock specific density
$\tau_{xy,yz,xz}$=elastic shear stress

DETAILED DESCRIPTION OF THE INVENTION

Figure 6:
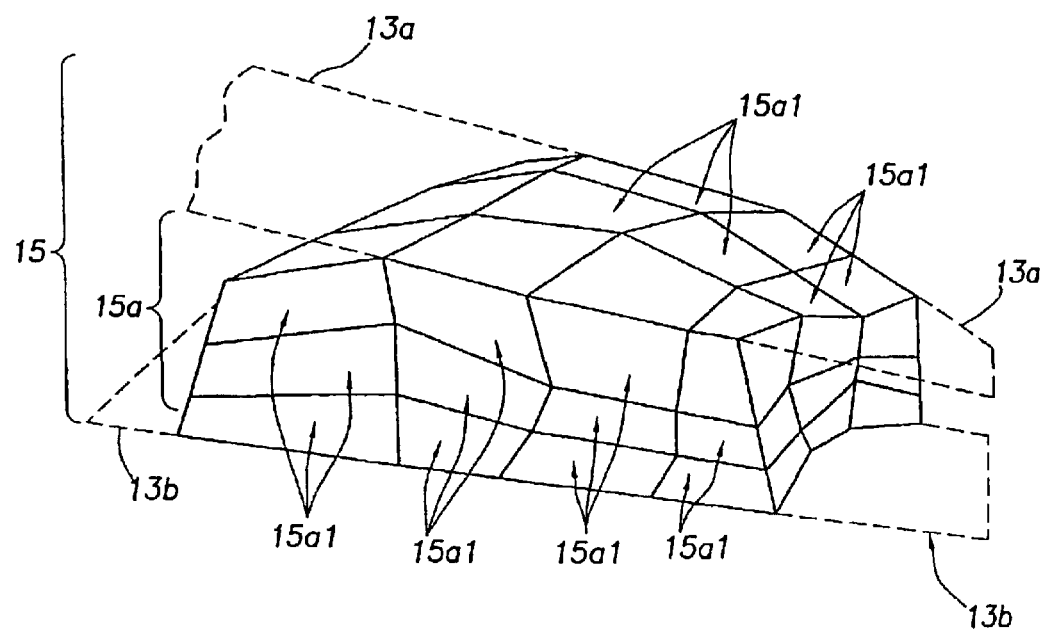

Referring to FIGS. 5 and 6, structured and unstructured grids are illustrated.

In FIG. 5, an earth formation 15 is illustrated, the formation 15 including four (4) horizons 13 which traverse the longitudinal extent of the formation 15 in FIG. 5. Recall that a "horizon" 13 is defined to be the top surface of an earth formation layer, the earth formation layer comprising, for example, sand or shale or limestone, etc.

A "grid" is located intermediate to the horizon layers 13. More particularly, a "grid" is formed: (1) in between the horizons 13, (2) on top of the uppermost horizon 13, and (3) below the lowermost horizon 13 in the Earth formation 15. When gridding the formation 15, the act or function of "gridding" the formation 15 includes the step of dividing the formation 15 into a multitude of individual "cells" which, when connected together, comprise the "grid".

In FIG. 6, for example, the Earth formation 15 includes an uppermost horizon 13a and a lowermost horizon 13b which is separated from the uppermost horizon 13a by an intermediate earth formation layer 15a. The intermediate earth formation layer 15a includes, for example, a sand layer or a shale layer or a limestone layer, etc. A particular "gridding software" will "grid" the earth formation layer 15a; that is, the formation layer 15a will be divided up, by the "gridding software" into a multitude of cells 15a1.

In the prior art, a "gridding software" product known as "Grid" was marketed by GeoQuest, a division of Schlumberger Technology Corporation, Abingdon, the United Kingdom (UK). The "Grid" software would divide the formation layers 15a into a multitude of cells. However, each of the multitude of cells were approximately "rectangular" in cross sectional shape.

In addition, another "gridding software", known as "Petragrid" is disclosed in U.S. Pat. No. 6,018,497, the disclosure of which is incorporated by reference into this specification. The "Petragrid" gridding software will 'grid' the formation with triangularly/tetrahedrally shaped grid cells, known as "unstructured grid cells".

In addition, another "gridding software", known as "Flogrid", is disclosed in U.S. Pat. No. 6,106,561, the disclosure of which is incorporated by reference into this specification. The "Flogrid" gridding software includes the "Petragrid" gridding software; however, in addition, the "Flogrid" gridding software will 'grid' the formation with rectangularly shaped grid cells, known as "structured grid cells".

In FIG. 6, the cells 15a1 are shown to be approximately "rectangular" in cross sectional shape. These grid cells are "structured grid cells".

In FIG. 5, however, a multitude of grid cells 15a1 have been formed in the earth formation 15 intermediate the horizons 13, and each cell 15a1 has a cross sectional shape that, in addition to being approximately "rectangular" in cross section, is either approximately "polygonal" or "tetrahedral" in cross section. FIG. 5 clearly shows a multitude of cells 15a1 where each cell 15a1 has a cross sectional shape which is either approximately "polygonal" or "tetrahedral" in cross sectional shape (i.e., an "unstructured grid cell") in addition to being approximately "rectangular" in cross sectional shape (i.e., a "structured grid cell").

Figure 7:
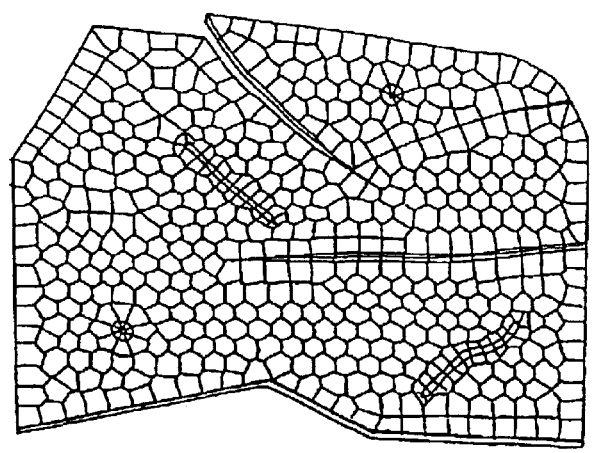
Figure 8:
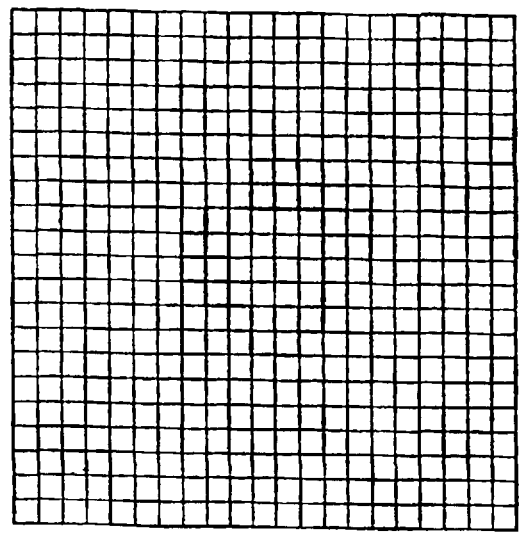
Figure 9:
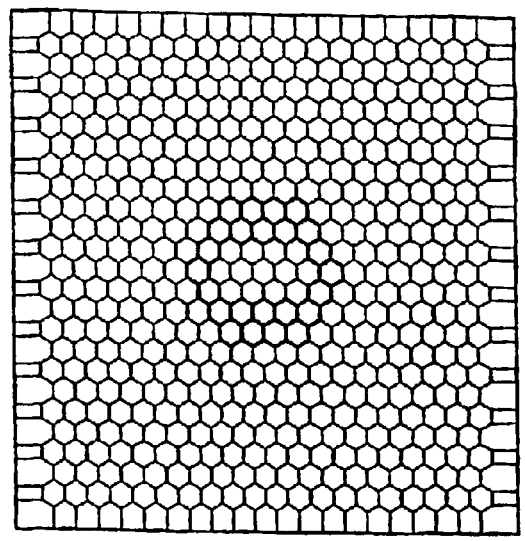

Referring to FIGS. 7, 8, and 9, other examples of "structured" and "unstructured" grid cells are illustrated. FIG. 7 illustrates examples of "un-structured" grid cells having a triangular/tetrahedral cross sectional shape. FIG. 8 illustrates examples of "structured" grid cells having an approximate "rectangular" cross sectional shape. FIG. 9 illustrates further examples of "unstructured" grid cells having a triangular/tetrahedral cross sectional shape.

Figure 10:
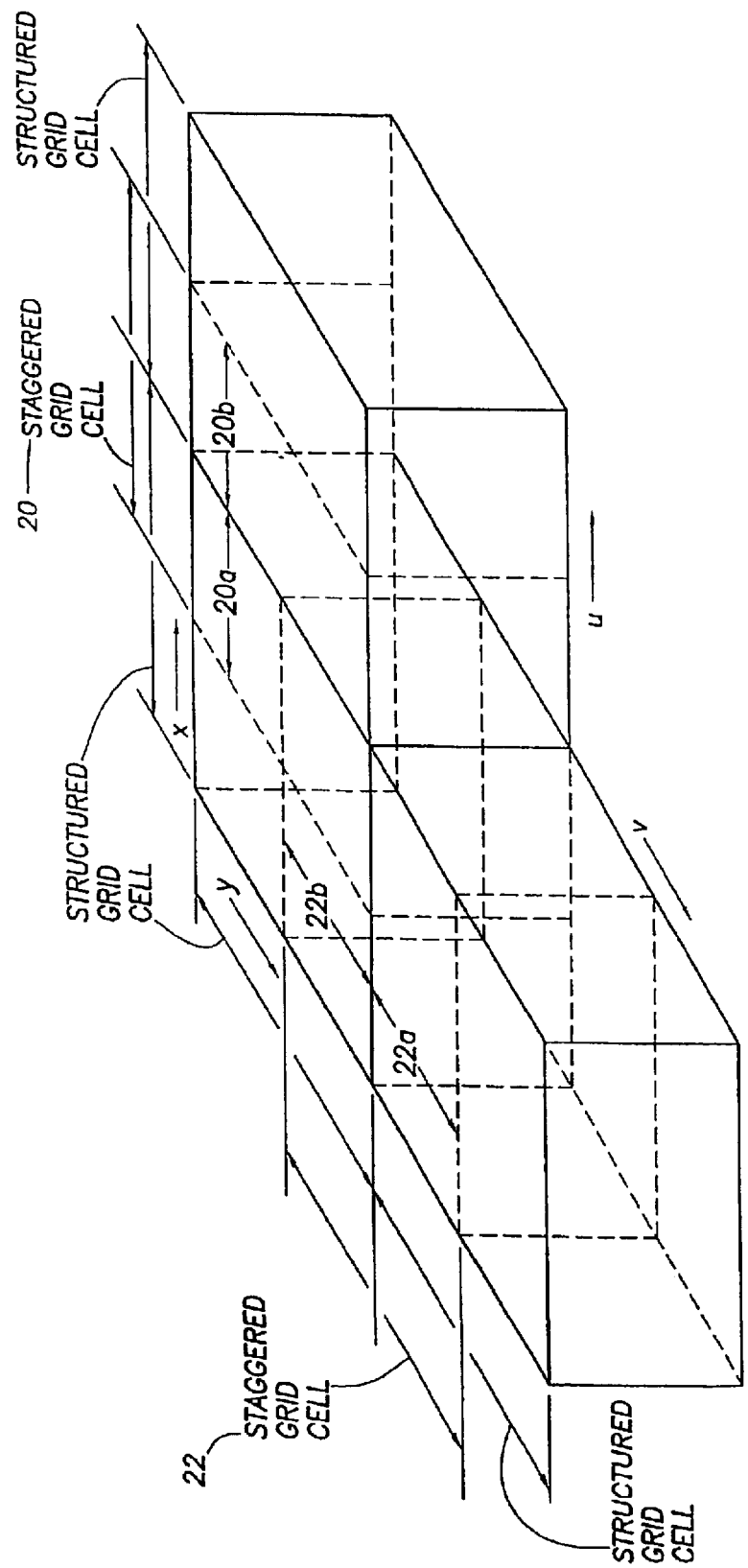
FIGS. 10 and 11*a* illustrate examples of a staggered grid.
Figure 11A:
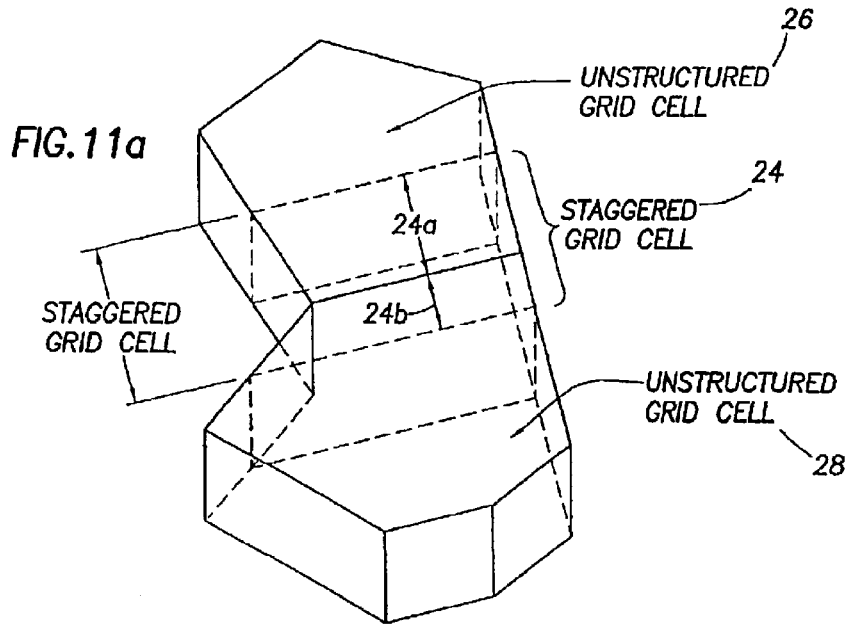

Referring to FIGS. 10 and 11a, a "staggered grid" will now be defined with reference to FIGS. 10 and 11a.

In FIG. 10, a plurality of "structured" grid cells are illustrated (i.e., cells having an approximately rectangularly shaped cross sectional shape). However, in FIG. 10, a pair of "staggered grid cells" are also illustrated. Assuming that a 'first structured or unstructured grid cell' is disposed directly adjacent a 'second neighboring structured or unstructured grid cell', a "staggered grid cell" can be defined as one which consists of a 'first half' and a 'second half', where the 'first half' of the 'staggered grid cell' comprises one-half of the 'first structured or unstructured grid cell' and the 'second half' of the 'staggered grid cell' comprises one-half of the 'second neighboring structured or unstructured grid cell'.

For example, in FIG. 10, the staggered grid cell 20 includes the one-half 20a of a first structured grid cell and the one-half 20b of the neighboring, second structured grid cell. Similarly, the staggered grid cell 22 includes the one-half 22a of a first structured grid cell and the one-half 22b of a neighboring, second structured grid cell.

In FIG. 11a, a pair of "unstructured" grid cells are illustrated (i.e., cells each having an approximately triangularly or tetrahedrally shaped cross sectional shape). In FIG. 11a, a staggered grid cell 24 consists of a first half 24a from one unstructured grid cell 26 and a second half 24b from a second unstructured grid cell 28.

Referring to FIGS. 11b, 12, 13, and 14, a computer workstation 44 or other computer system 44 is illustrate&

Figure 11B:
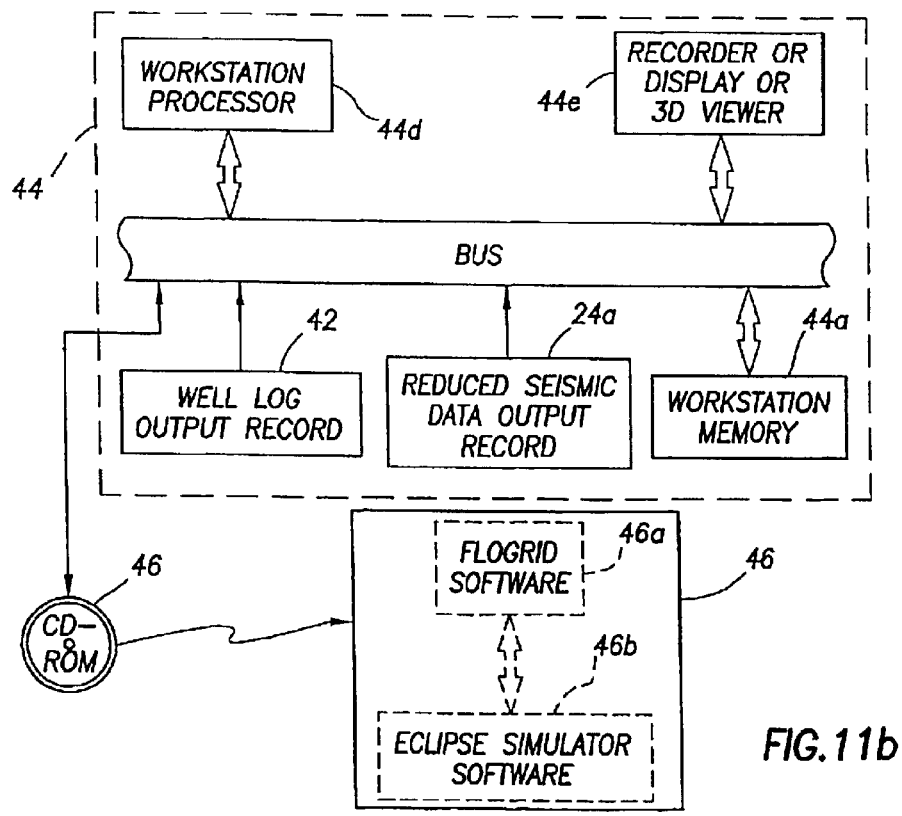
FIGS. 11*b*, 12 and 13 illustrate the "Flogrid" software and the "Eclipse simulator software" and the generation of 'simulation results' which are displayed on a 3-D viewer.

In FIG. 11b, the computer workstation 44 in FIG. 11b includes a system bus, a workstation processor 44d connected to the bus, a workstation memory 44a connected to the bus, and a recorder or display or 3D viewer 44e connected to the bus. A CD-Rom 46 is inserted into the workstation and the following software is loaded from the CD-Rom 46 and into the workstation memory 44a: (1) a "Flogrid" software 46a, and (2) an Eclipse simulator software 46b. The "Flogrid" software is described in U.S. Pat. No. 6,106,561 to Farmer, the disclosure of which has already been incorporated by reference into this specification. Input data is provided to and input to the workstation 44: (1) a well log output record 42, and (2) a reduced seismic data output record 24a.

Figure 12:
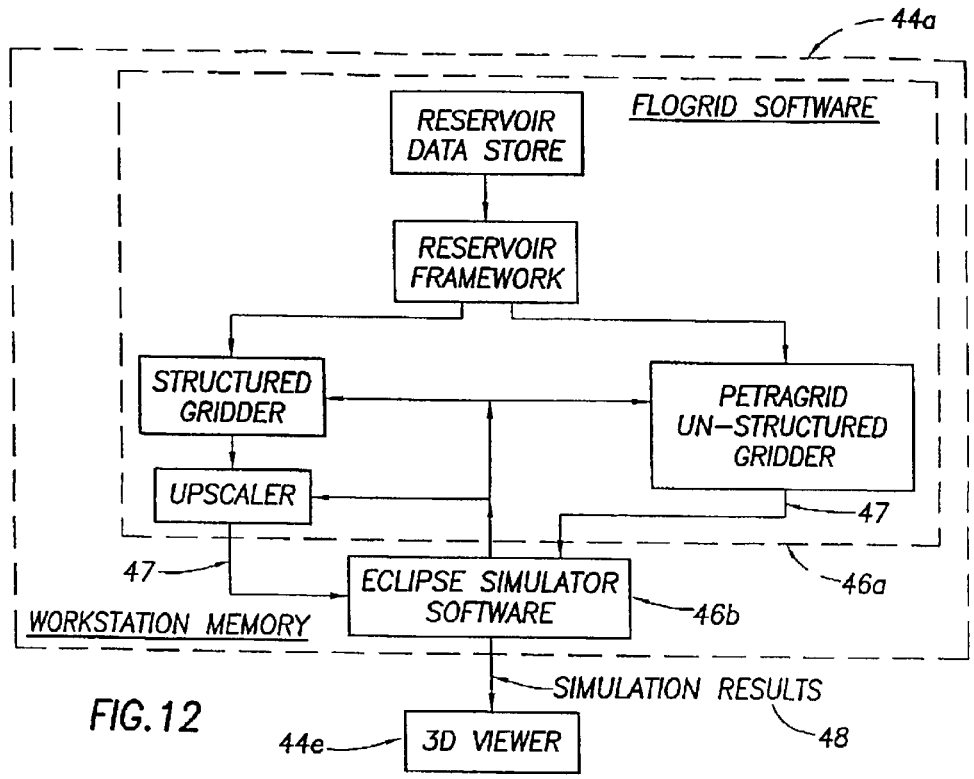

In FIG. 12, the workstation memory 44a of FIG. 11b stores the Flogrid software 46a and the Eclipse simulator software 46b. The Flogrid software 46a includes a reservoir data store, a reservoir framework, a structured gridder, a "Petragrid" Un-structured gridder, and an Upscaler. The outputs 47 from the Upscaler and from the Petragod Unstructured gridder are provided as inputs to the Eclipse simulator software 46b. The "Petragrid" Un-structured gridder is disclosed in U.S. Pat. No. 6,018,497 to Gunasekera, the disclosure of which has already been incorporated by reference into this specification. The Eclipse simulator software 46b, responsive to the outputs 47, generates a set of 'simulation results' 48 which are provided to the 3D viewer 44e. The Eclipse simulator software 46b includes a "Linear Solver" which is discussed in U.S. Pat. No. 6,230,101 to Wallis, the disclosure of which is incorporated by reference into this specification.

Figure 13:
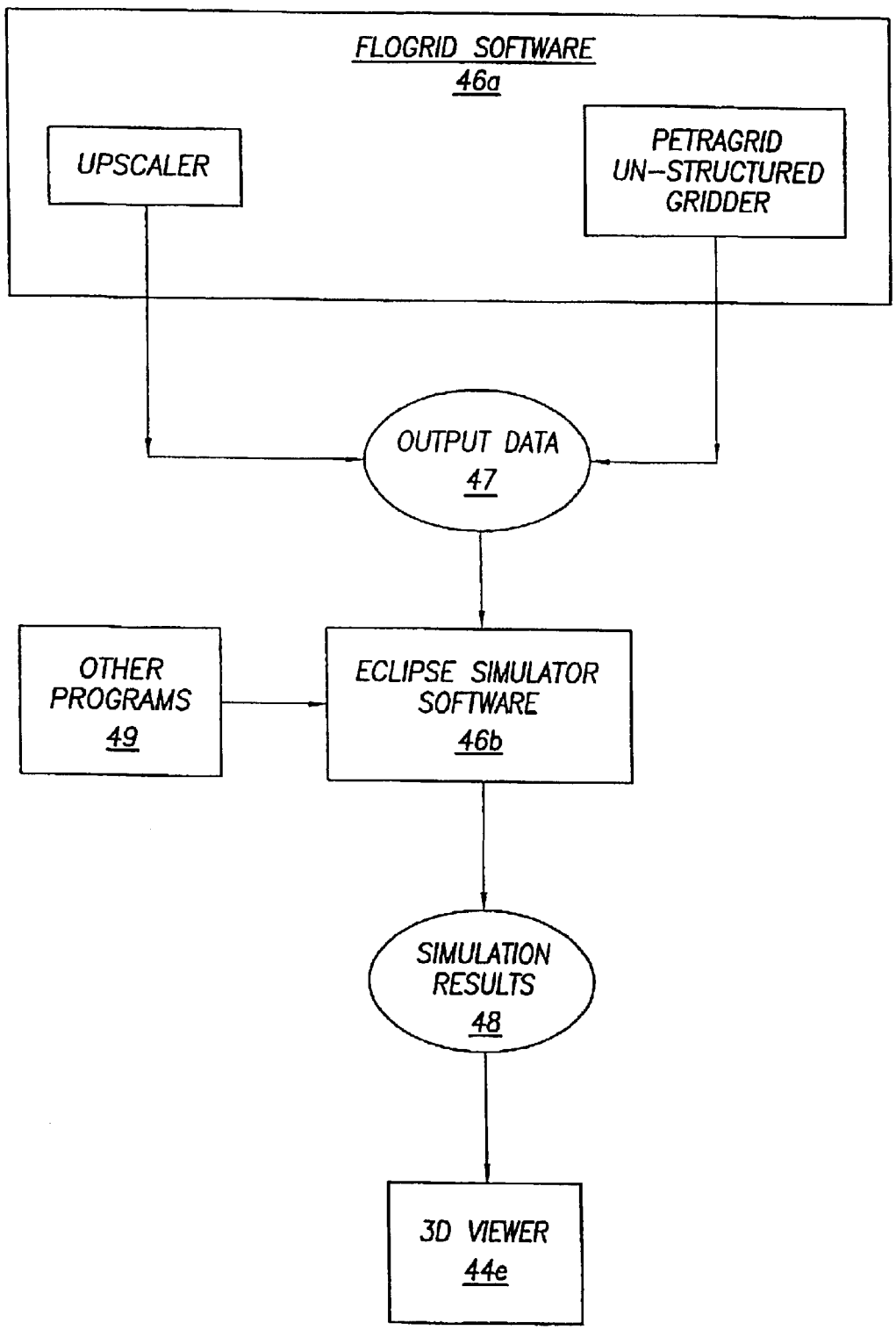

In FIG. 13, to summarize FIGS. 11b and 12, output data 47 is generated from the Upscaler and the Petragrid unstructured gridder in the Flogrid software 46a, and that output data 47 is provided to the Eclipse simulator software 46b, along with the outputs of other programs 49. Responsive thereto, the Eclipse simulator software 46b generates a set of simulation results 48 which are, in turn, provided to the 3D viewer 44e.

Figure 14:
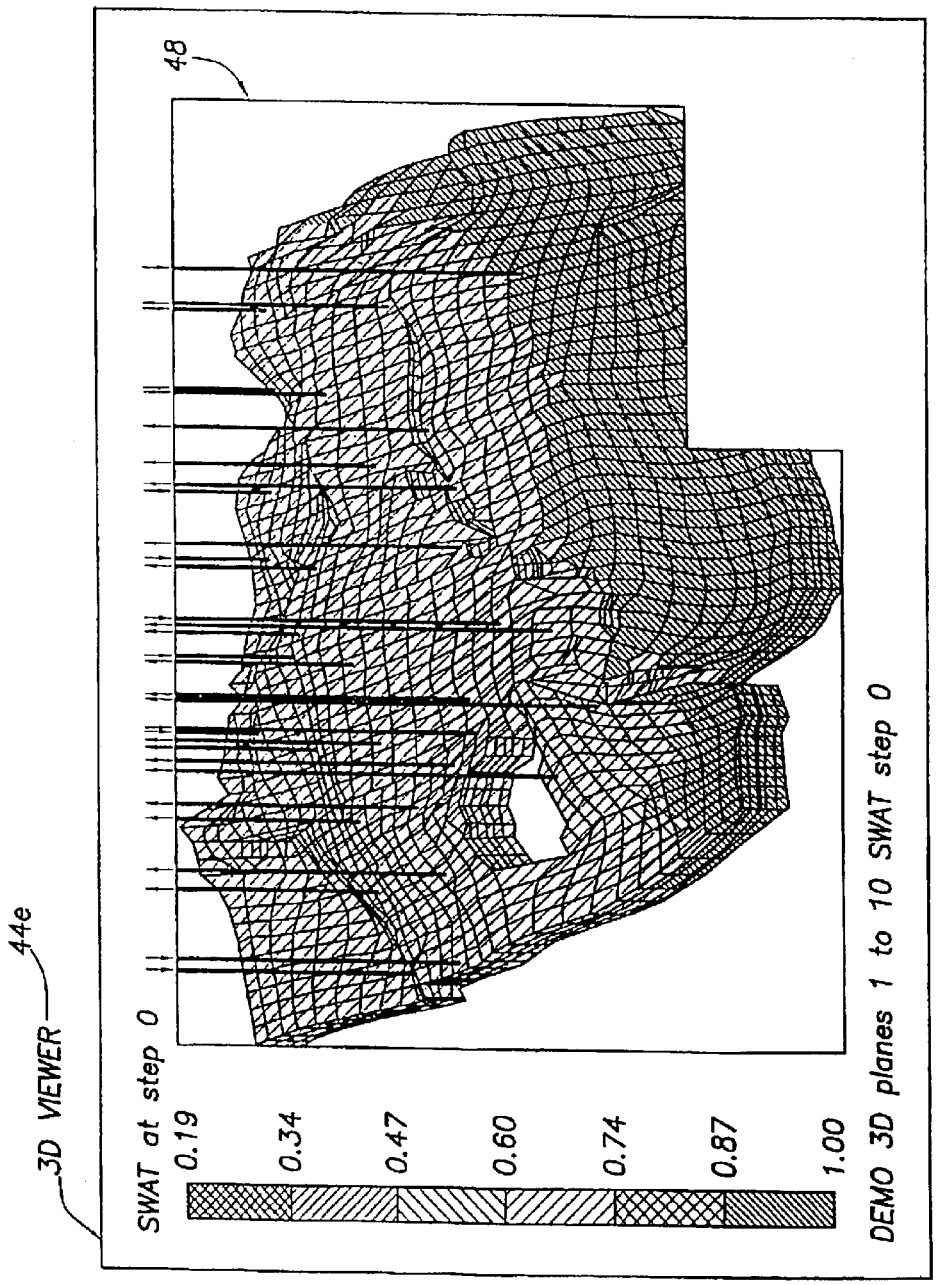
FIG. 14 illustrates an example of the 'simulation results'.

In FIG. 14, one example of the simulation results 48, which are displayed on the 3D viewer 44e of FIG. 13, is illustrated.

Figure 15:
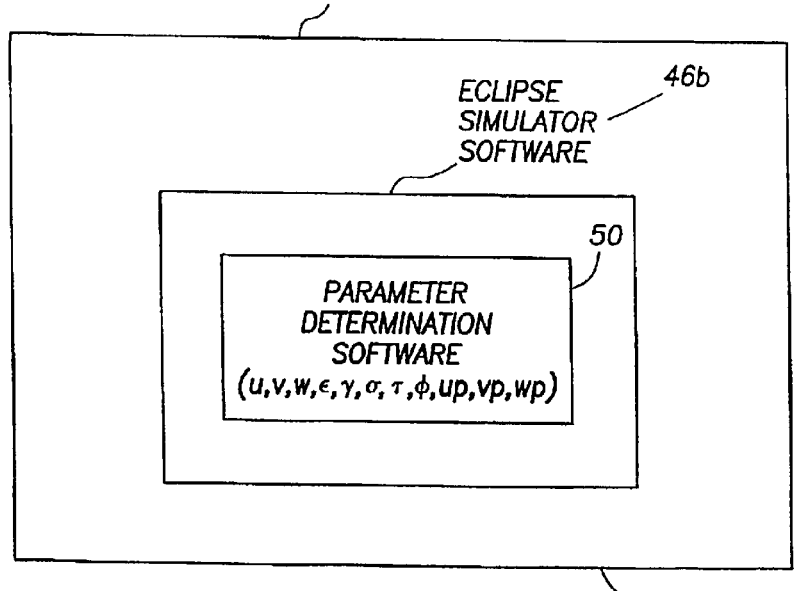
FIG. 15 illustrates the fact that the "Eclipse simulator software" includes the 'Parameter Determination Software' of the present invention.

Referring to FIG. 15, as previously discussed, the workstation memory 44a stores the Eclipse simulator software 46b. However, in accordance with one aspect of the present invention, the Eclipse simulator software 46b includes a Parameter Determination software 50. The "parameters" are determined for each "staggered grid cell", such as each of the "staggered grid cells" shown in FIGS. 10 and 11a of the drawings. The "parameters", which are determined by the Parameter Determination software 50 for each 'staggered grid cell', include the following "parameters", which have been previously discussed in the "Description of the Invention" portion of this specification:

u=rock displacement in the x-direction
v=rock displacement in the y-direction
w=rock displacement in the z-direction Therefore, the parameter (u, v, w) represent the movement of the rock When the aforementioned parameters (u, v, w) have been determined, the following "additional parameters" are determined for each 'staggered grid cell' from and in response to the parameters (u, v, w), and these "additional parameters" have also been discussed in the "Description of the Invention" portion of this specification:

$\epsilon_{x,y,z}$=x,y,z elongation strains
$\gamma_{xy,yz,zx}$=shear strains
$\sigma_{x,y,z}$=elastic normal rock stress in x,y,z directions
$\tau_{xy,yz,xz}$=elastic shear stress
$\phi$=porosity of rock (variable)
$u_p$=plastic rock displacement in the x-direction
$v_p$=plastic rock displacement in the y-direction
$w_p$=plastic rock displacement in the z-direction Recall equation (3) set forth in the "Description of the Invention" portion of this specification, as follows:

$$\varepsilon_x = \frac{\partial u}{\partial x} \quad (3)$$
$$\varepsilon_y = \frac{\partial v}{\partial y}$$
$$\varepsilon_z = \frac{\partial w}{\partial z}$$

-continued $$\gamma_{xy} = \frac{\partial u}{\partial y} + \frac{\partial v}{\partial x}$$

$$\gamma_{yz} = \frac{\partial v}{\partial z} + \frac{\partial w}{\partial y}$$

$$\gamma_{zx} = \frac{\partial w}{\partial x} + \frac{\partial u}{\partial z}$$

We start by estimating values for (u, v, w), which is hereinafter referred to as the 'estimating procedure'. Therefore, when (u, v, w) is estimated by the Parameter Determination software 50 of the present invention, the values of "$\epsilon_{x,y,z}$" (the 'x,y,z elongation strains') and "$\gamma_{xy,yz,zx}$" (the 'shear strains') are determined from the above equation (3). When "$\epsilon_{x,y,z}$" and "$\gamma_{xy,yz,zx}$" are determined from equation (3), the values of "$\sigma_{x,y,z}$" (the 'elastic normal rock stress in x,y,z directions') and "$\tau_{xy,yz,xz}$" (the 'elastic shear stress') are fiercer determined from the above described equation (2), as follows:

$$\sigma_x = 2G\epsilon_x + \lambda(\epsilon_x + \epsilon_y + \epsilon_z)$$

$$\sigma_y = 2G\epsilon_y + \lambda(\epsilon_x + \epsilon_y + \epsilon_z)$$

$$\sigma_z = 2G\epsilon_z + \lambda(\epsilon_x + \epsilon_y + \epsilon_z)$$

$$\tau_{xy} = G\gamma_{xy}$$

$$\tau_{yz} = G\gamma_{yz}$$

$$\tau_{zx} = G\gamma_{zx} \quad (2)$$

Now that "$\sigma_{x,y,z}$" and "$\tau_{xy,yz,zx}$" are known, the previously described set of 'rock momentum balance' differential equations [that is, equation (1)] are solved using the aforementioned known values of "$\sigma_{x,y,z}$" and "$\tau_{xy,yz,xz}$". After the 'rock momentum balance' differential equations are solved, if the resultant 'residuals' are determined to be approximately equal to zero (0), the previously estimated values of (u, v, w) are thereby determined to represent 'accurate rock displacement parameters' for the reservoir. Subsidence is determined from the 'accurate rock displacement parameters' by solving a final set of failure criterion equations, which comprise the residuals and any derivatives, to determine a set of rock plastic displacements ($u_p$=plastic rock displacement in the x-direction, $v_p$=plastic rock displacement in the y-direction, and $w_p$=plastic rock displacement in the z-direction) forming a part of the rock displacement parameters (u, v, w).

The Parameter Determination software 50 will also determine "$\phi$", the porosity of rock, which is a variable set forth in equation (5) set forth above.

Figures 16, 17:
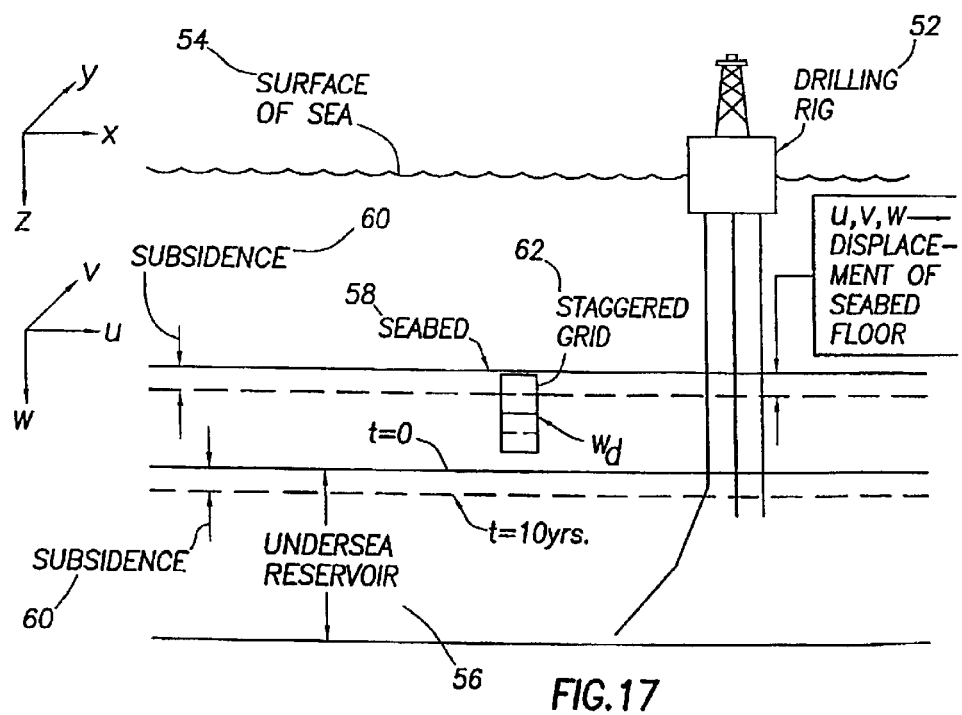
FIG. 16 illustrates the results which arm generated when the 'Parameter Determination Software' is executed by a processor of a workstation, the results being presented and displayed on a recorder or display device.
FIG. 17 illustrates how the results generated in FIG. 16 assist in determining subsidence in an oilfield reservoir.

Referring to FIG. 16, when the parameters (u, v, w, $\epsilon_{x,y,z}$, $\gamma_{xy,yz,zx}$, $\sigma_{x,y,z}$, $\tau_{xy,yz,xz}$, $\phi$, $u_p$, $v_p$, $w_p$) have been determined, as discussed above, for each staggered grid block or cell, the Recorder or Display or 3D Viewer 44e of FIG. 11b will illustrate a "Table" similar to the "Table" shown in FIG. 16.

In the Table of FIG. 16, for staggered grid block 1 ("SGB1"), a first set of the parameters "(u, v, w, $\epsilon_{x,y,z}$, $\gamma_{xy,yz,zx}$, $\sigma_{x,y,z}$, $\tau_{xy,yz,xz}$, $\phi$, $u_p$, $v_p$, $w_p$)" will be generated and displayed on the Recorder or Display device 44e.

Similarly, in the Table of FIG. 16, for staggered grid block 2 ("SGB2"), a second set of the parameters "(u, v, w, $\epsilon_{x,y,z}$, $\gamma_{xy,yz,zx}$, $\sigma_{x,y,z}$, $\tau_{xy,yz,xz}$, $\phi$, $u_p$, $v_p$, $w_p$)" will be displayed on the Recorder or Display device 44e.

Similarly, in the Table of FIG. 16, for staggered grid block "n" ("SGBn"), an n-th set of the parameters "(u, v, w, $\epsilon_{x,y,z}$, $\gamma_{xy,yz,zx}$, $\sigma_{x,y,z}$, $\tau_{xy,yz,xz}$, $\phi$, $u_p$, $v_p$, $w_p$)" will be generated and displayed on the Recorder or Display device 44e.

Referring to FIG. 17, when the "Table" of FIG. 16 is generated and displayed on the display device 44e, it is now possible to determine 'Subsidence' in an oilfield reservoir. The term 'subsidence' refers to a failing or 'giving away' of the seabed floor. In FIG. 17, a drilling rig 52 is situated at the surface of the sea 54. The drilling rig 52 withdraws underground deposits of hydrocarbon (e.g., oil) and other fluids (e.g. water) from an undersea reservoir 56 which is located below the seabed floor 58. Over a period of, for example, ten years, a certain amount of subsidence 60 occurs due to the withdrawal of the underground deposits of hydrocarbon and water from the undersea reservoir 56, the subsidence 60 producing a lowering of the seabed floor 58 a certain amount which corresponds to the subsidence 60.

In FIG. 17, the Parameter Determination Software 50 of FIG. 15 determines the aforementioned subsidence 60 by first determining (via the 'estimating procedure' discussed above) the 'accurate rock displacement parameters (u, v, w)' for the reservoir. These 'accurate rock displacement parameters (u, v, w)' represent the 'movement of the rock', or, in our example, the displacements of the seabed floor 58 in the (x, y, z) directions over the ten year example period. These displacements of the seabed floor 58 occur as a result of the subsidence 60 (that is, the 'failing' or the 'giving away' of the ground or seabed floor) illustrated in FIG. 17. Therefore, the parameters (u, v, w) represent or characterize 'rock movement in the x, y, and z directions' which, in turn, represent or characterize the 'subsidence 60'. Note that the 'accurate rock displacement parameters (u, v, w)' may include: (1) a displacement that is 'elastic', and (2) a displacement that is 'plastic' which is denoted ($u_p$, $v_p$, $w_p$). These plastic displacements ($u_p$, $v_p$, $w_p$) were referred to above under 'Description of the Invention' in the section entitled 'Plasticity'. 'Subsidence' is the result of a 'failure' of the rock, for example by crushing, cracking or some other failure mechanism. When the rock has failed, some of its displacement is not recoverable when the original conditions are imposed, and it is the presence of this unrecoverable displacement ($u_p$, $v_p$, $w_p$) that characterizes the 'subsidence' 60. Also note that the undersea formation in FIG. 17 is gridded with structured and unstructured grids, and, as a result, the undersea formation in FIG. 17 is gridded with "staggered grids", as graphically illustrated by the staggered grid 62 in FIG. 17. The flowchart of FIG. 18 will describe the method, practiced by the Parameter Determination Software 50 of FIG. 15, for determining the 'accurate rock displacement parameters (u, v, w)' which represent these displacements in the (x, y, z) directions due to the subsidence 60.

Figure 18:
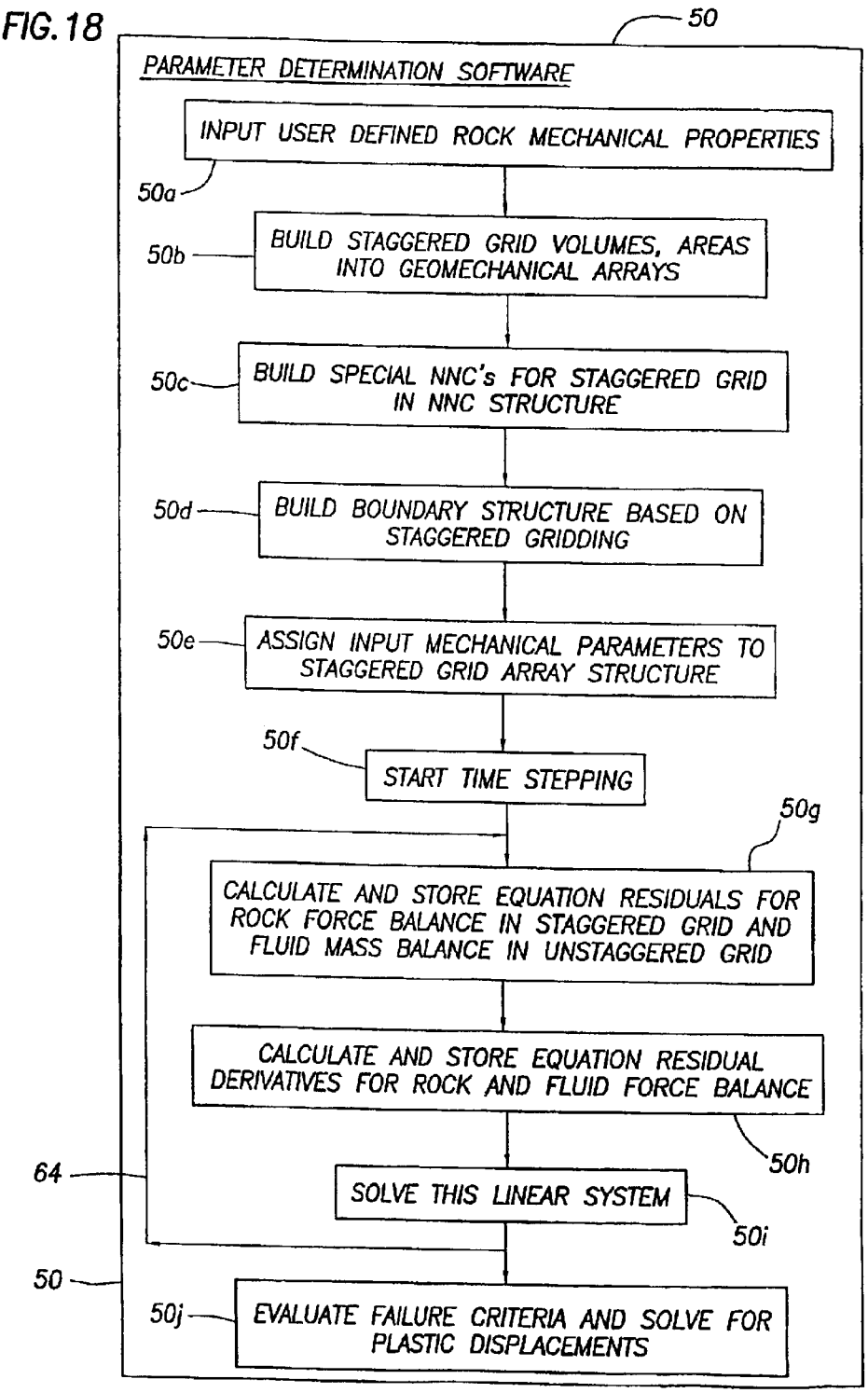
FIG. 18 is a detailed flowchart of the 'Parameter Determination Software' of the present invention.

Referring to FIG. 18, a flowchart is illustrated which describes the method practiced by the Parameter Determination Software 50 for determining the parameters (u, v, w) representing the rock displacements in the (x, y, z) directions (i.e., the 'movement of the rock') due to the subsidence illustrated in FIG. 17.

In FIG. 18, the Parameter Determination Software 50 will determine the 'rock movement' parameters (u, v, w) in accordance with the following steps. With reference to FIG. 18, each step of the Parameter Determination software 50 will be discussed in detail below as follows:

1. Input User Defined Rock Mechanical Properties—Block 50a

The user inputs a lot of data, called the "input file", comprising keywords that define the particular simulation that is desired. Part of these keywords represent the mechanical properties of the rock. These "mechanical properties of the rock" are the kind of properties that are needed to drive the equations set forth above known as the "rock momentum balance equations" which are identified above as "equation (1)".

2. Build Staggered Grid Volumes, Areas into Geomechanical Arrays—Block 50*b*

When the "input file" comprising the "mechanical properties of the rock" is entered, the staggered grid can be built. In this case, we need the staggered grid 'volumes' (how much volume space the staggered grid would enclose) and the 'areas' (how much surface area the staggered grids would include). These 'volumes' and 'areas' are built into special 'arrays' used for geomechanics calculations.

3. Build Special NNC's for Staggered Grid in NNC Structure—Block 50*c*

When the aforementioned 'arrays', used for the geomechanics calculations, are built, the next step is to build special NNC's. The acronym NNC refers to "Non-Neighbor Connections". Because the above defined 'equation (1)' [the "rock momentum balance equations"] are more difficult to solve than the standard reservoir simulation equations, it is necessary to create extra connections on the different grid blocks during the simulation in order to solve 'equation (1)' properly. Therefore, during this step, we build up these "Non-Neighbor Connections" for the staggered grid in a special "Non-Neighbor Connections Structure" or "NNC structure" that has been created inside the simulator. The "NNC structure" is a collection of arrays and special areas that have been set aside inside the simulator.

4. Build Boundary Structure Based on Staggered Gridding—Block 50*d*

When the "NNC structure" has been created inside the simulator, it is necessary to build up the boundaries representing the edges of the simulation or grid. The edges of the grid need this 'boundary structure', which is, in turn, based on the staggered grid. The whole 'boundary structure', which is a collection or arrays representing the 'boundary conditions', has to be set up in order to rigorously solve the above mentioned equations, namely, the "rock momentum balance equations" defined above as 'equation (1)'.

5. Assign Input Mechanical Parameters to Staggered Grid Array Structure—Block 50*e*

When the 'boundary structure' has been build based on the staggered gridding, it is necessary to assign input mechanical parameters to the staggered grid array structure. After this is accomplished, the time stepping can now commence.

6. Start Time Stepping—Block 50*f*

When the input mechanical parameters are assigned to the staggered grid array structure, the simulator will now start 'time stepping'. The simulator 46*b* of FIG. 15 will time step forward in time and project into the future to determine what will happen.

7. Calculate and Store Equation Residuals for Rock and Fluid Force Balance in Staggered Grid—Block 50*g*

The first thing that is accomplished after the 'time stepping' is commenced is to calculate and store the equation residuals for the 'rock and fluid force balance'. The 'rock and fluid force balance' refers to 'equation (1)', that is, the "rock momentum balance equations", which are set forth above and are duplicated below as follows:

$$\frac{\partial \sigma_x}{\partial x} + \frac{\partial \tau_{yx}}{\partial y} + \frac{\partial \tau_{zx}}{\partial z} + F_x + P_x = 0 \quad (1)$$

$$\frac{\partial \sigma_y}{\partial y} + \frac{\partial \tau_{xy}}{\partial x} + \frac{\partial \tau_{zy}}{\partial z} + F_y + P_y = 0$$

-continued
$$\frac{\partial \sigma_z}{\partial z} + \frac{\partial \tau_{xz}}{\partial x} + \frac{\partial \tau_{yz}}{\partial y} + F_z + P_z = 0.$$

The simulator will actually calculate the "rock momentum balance equations" representing 'equation (1)', and the residuals are exactly as set forth in 'equation (1)'. Referring to 'equation (1)' set forth above (that is, the "rock momentum balance equations"), the term "residual" can be defined as follows: "How different from '0' is the left-hand side of the above referenced 'equation (1)'?". The objective is to try to make the left-hand side of 'equation (1)' equal to '0', which is the right-hand side of the 'equation (1)'. The simulator 46*b* of FIG. 15 will therefore "calculate the 'rock momentum balance equations' representing 'equation (1)', that is, the simulator 46*b* will adjust the parameters (u, v, w) and porosity and other resultant variables as set forth above in equations (2) and (3), until the left-hand side of the above 'equation (1)' is equal to the right-hand side of 'equation (1)', where the right-hand side of 'equation (1)' is equal to '0'. Therefore, we know that we have solved the above referenced "rock momentum balance equations" of 'equation (1)' when the left-hand side of 'equation (1)' is equal to '0'. We find out how far away from '0' we are by calculating the 'residuals'.

8. Calculate and Store Equation Residual Derivatives for Rock and Fluid Force Balance—Block 50*h*

At this point, we calculate and store the equation residual derivatives (which are required for the Newton gradient search), which derivatives will drive the "rock momentum balance equations" residuals [identified as 'equation (1)'] to '0'. At this point, we have: (1) 'residuals', and we have (2) 'derivatives of these residuals'.

9. Solve this Linear System—Block 50*i*

Now that we know:

(1) the 'Residuals', and (2) the 'Derivatives of these Residuals', we can now solve this whole 'system of linear equations' representing the 'rock momentum balance equations' of 'equation (1)' which are set forth again below, as follows:

$$\frac{\partial \sigma_x}{\partial x} + \frac{\partial \tau_{yx}}{\partial y} + \frac{\partial \tau_{zx}}{\partial z} + F_x + P_x = 0 \quad (1)$$

$$\frac{\partial \sigma_y}{\partial y} + \frac{\partial \tau_{xy}}{\partial x} + \frac{\partial \tau_{zy}}{\partial z} + F_y + P_y = 0$$

$$\frac{\partial \sigma_z}{\partial z} + \frac{\partial \tau_{xz}}{\partial x} + \frac{\partial \tau_{yz}}{\partial y} + F_z + P_z = 0.$$

The above referenced 'rock momentum balance equations' of 'equation (1)' are solved together and simultaneously with the standard reservoir simulation equations.

When the above referenced 'rock momentum balance equations' of 'equation (1)' are solved, the "u", "v", and "w" displacement parameters, representing movement of the rock, are determined, where:

u=rock displacement in the x-direction v=rock displacement in the y-direction w=rock displacement in the z-direction When the displacement parameters (u, v, w) are determined, the above referenced 'equation (3)' is used to determine "$\epsilon_{x,y,z}$" (the 'x,y,z elongation strains') and "$\gamma_{xy,yz,zx}$" (the 'shear strains'), since "$\epsilon_{x,y,z}$" and "$\gamma_{xy,yz,zx}$" are function of "u", "v", and "w", as follows:

$$\varepsilon_x = \frac{\partial u}{\partial x} \quad (3)$$

$$\varepsilon_y = \frac{\partial v}{\partial y}$$

$$\varepsilon_z = \frac{\partial w}{\partial z}$$

$$\gamma_{xy} = \frac{\partial u}{\partial y} + \frac{\partial v}{\partial x}$$

$$\gamma_{yz} = \frac{\partial v}{\partial z} + \frac{\partial w}{\partial y}$$

$$\gamma_{zx} = \frac{\partial w}{\partial x} + \frac{\partial u}{\partial z}$$

When "$\epsilon_{x,y,z}$" and "$\gamma_{xy,yz,zx}$" are determined from 'equation (3)', the above referenced 'equation (2)' is used to determine "$\sigma_{x,y,z}$" (the 'elastic normal rock stress in x,y,z directions') and "$\tau_{xy,yz,xz}$" (the 'elastic shear stress') since "$\sigma_{x,y,z}$" and "$\tau_{xy,yz,xz}$" are a function of "$\epsilon_{x,y,z}$" and "$\gamma_{xy,yz,zx}$" in 'equation (2)' as follows:

$$\sigma_x = 2G\epsilon_x + \lambda(\epsilon_x + \epsilon_y + \epsilon_z)$$

$$\sigma_y = 2G\epsilon_y + \lambda(\epsilon_x + \epsilon_y + \epsilon_z)$$

$$\sigma_z = 2G\epsilon_z + \lambda(\epsilon_x + \epsilon_y + \epsilon_z)$$

$$\tau_{xy} = G\gamma_{xy}$$

$$\tau_{yz} = G\gamma_{yz}$$

$$\tau_{zx} = G\gamma_{zx} \quad (2)$$

When the "$\sigma_{x,y,z}$" and "$\tau_{xy,yz,xz}$" are determined from 'equation (2)', the above referenced 'equation (1)' is solved, since 'equation (1)' is a function of "$\sigma_{x,y,z}$" and "$\tau_{xy,yz,xz}$", as follows:

$$\frac{\partial \sigma_x}{\partial x} + \frac{\partial \tau_{yx}}{\partial y} + \frac{\partial \tau_{zx}}{\partial z} + F_x + P_x = 0 \quad (1)$$

$$\frac{\partial \sigma_y}{\partial y} + \frac{\partial \tau_{xy}}{\partial x} + \frac{\partial \tau_{zy}}{\partial z} + F_y + P_y = 0$$

$$\frac{\partial \sigma_z}{\partial z} + \frac{\partial \tau_{xz}}{\partial x} + \frac{\partial \tau_{yz}}{\partial y} + F_z + P_z = 0.$$

The result of these calculations will produce the Table of FIG. 16. A reservoir engineer would be interested in knowing each of the quantities shown in the Table of FIG. 16.

10. Evaluate Failure Criteria and Solve for Plastic Displacements—Block 50*i*

A final step is required if the reservoir engineer has specified regions in the step 50*a* in FIG. 18 where the rock may fail. In this case, the final "$\sigma_{x,y,z}$" and "$\tau_{xy,yz,xz}$" are used to evaluate the chosen failure criterion which may be Mohr-Coulomb as referred to above in the section 'Description of the Invention' subsection Plasticity. If the failure criterion is exceeded, then a set of equations is set up to solve for the plastic displacements, denoted ($u_p$, $v_p$, $w_p$) above, which will force the failure criterion residual to be exactly zero. This system is set up and solved exactly as described above with the exception that the residuals are now the failure criterion residuals which are driven to zero instead of the equation (1) residuals. This step is 50*j* in FIG. 18.

In FIG. 18, when the 'system of linear equations' set forth above as 'equation (1)' has been solved, referring to the 'feed-back loop' 64 in FIG. 18, the simulator 46*b* of FIG. 15 continues its 'time stepping' by repeating the implementation of blocks 50*g*, 50*h*, 50*i* and 50*j* in FIG. 18.

When the flow chart of FIG. 18 is executed, the 'result' is: a solution to a problem, which a reservoir engineer would want to solve, in which you have certain boundary conditions applied to the rock, boundary conditions applied to 'equation (1)', and boundary conditions applied to the reservoir simulation equations. For example, in the North Sea, problems with 'subsidence' exist. The term 'subsidence' is a situation where the ground actually 'gives-way' or 'fails'. The above calculation would be applied to this 'subsidence' problem. The above type of calculation, which represents a solution to the above referenced 'Elastic Stress Equations' using 'staggered gridding', would be used to handle the 'more difficult' fields, such as the fields having the 'subsidence' problem of FIG. 17.

In summary, rock will initially behave elastically because it is in equilibrium and there are no external forces. Elastic behavior means that the rock behaves like a spring; that is, you can push it (i.e., apply force) and it will return exactly to its original position when you stop pushing. Subsidence happens when the rock is pushed beyond its own strength. For example, in a particular reservoir where certain wells are withdrawing fluids, the rock may no longer have the support of the water pressure, and the weight of the overburden will become high enough to cause the rock to fail. If the rock fails, e.g. by crushing or cracking, then, it no longer moves elastically but rather moves plastically. This plastic movement is what is referred to as "subsidence". We know this will occur because we solve 'equation (1)', which are the rock momentum balance equations (otherwise known as rock force balance equations). If these equations tell us that the forces become too large in one direction relative to the forces in another direction at some particular point in time, then, we know that failure will occur. At this point, we further solve a final set of equations which will calculate the plastic displacements. "Derivatives" are needed because these equations are nonlinear.

References

The following references (1 through 26) are incorporated by reference into the specification of this application:

1. Hansen, K. S., Prats, M., Chan, C. K., "Finite-element modeling of depletion-induced reservoir compaction and surface subsidence in the South Belridge oil field, California", SPE 26074, presented at the Western Regional Meeting, Anchorage, Ak., U.S.A, 26–28 May, 1993.
2. Berumen, S., Cipolla, C., Finkbeiner, T., Wolhart, S., Rodriguez, F., "Integrated reservoir geomechanics techniques in the Burgos Basin, Mexico: An improved gas reservoirs management", SPE 59418 presented at the 2000 SPE Asia Pacific Conference on Integrated Modelling for Asset Management, Yokohama, Japan, 25–26 Apr., 2000.
3. Kojic, M., Cheatham, J. B., "Theory of plasticity of porous media with fluid flow", SPE 4394, printed in *Transactions*, volume 257, June 1974.
4. Kojic, M., Cheatham, J. B., "Analysis of the influence of fluid flow on the plasticity of porous rock under an axially symmetric punch", SPE 4243, printed in *Transactions*, volume 257, June 1974.
5. Corapcioglu, M. Y., Bear, J., "Land Subsidence", presented at the NATO Advanced Study Institute on Mechanics of Fluids in Porous Media, Newark Del., U.S.A., 18–27 Jul., 1982.

6. Demirdzic, I., Martinovic, D., "Finite volume method for thermo-elasto-plastic stress analysis", Computer Method in Applied Mechanics and Engineering 109, 331–349, 1993.
7. Demirdzic, I., Muzaferija, S., "Finite volume method for stress analysis on complex domains", International Journal for Numerical Methods in Engineering, vol. 37, 3751–3766, 1994.
8. Settari, A., Walters, D. A., "Advances in coupled geomechanical and reservoir modeling with applications to reservoir compaction", SPE 51927 presented at the 1999 SPE Reservoir Simulation Symposium, Houston Tex., 14–17 Feb., 1999.
9. Heffer, K. J., Koutsabeloulis, N. C., Wong, S. K., "Coupled geomechanical, thermal and fluid flow modelling as an aid to improving waterflood sweep efficiency", Eurock '94, Balkema, Rotterdam, 1994.
10. Gutierrez, M., and Lewis, R. W., "The role of geomechanics in reservoir simulation", Proceedings Eurock '98, Vol. 2, 439–448, 1998.
11. Geerisma, J., "Land subsidence above compacting oil and gas reservoirs", *JPT* (1973), 734–744.
12. Holt, R. E., "Permeability reduction induced by a nonhydrostatic stress field", *SPE Formation Evaluation*, 5, 444–448.
13. Rhett, W. and Teufel, L. W., "Effect of reservoir stress path on compressibility and permeability of sandstones", presented at SPE 67$^{th}$ Annual Technical conference and Exhibition, SPE 24756, Washington, D.C., October, 1992.
14. Ferfera, F. R., Sarda, J. P., Bouteca, M., and Vincke, O., "Experimental study of monophasic permeability changes under various stress paths", *Proceedings of 36$^{th}$ U.S. Rock Mechanics Symposium*, Kim (ed.), Elsevier, Amsterdam.
15. Teufel, L. W., Rhett, W. and Farrell, H. E., "Effect of reservoir depletion and pore pressure drawdown on in situ stress and deformation in the Ekofisk field, North Sea", *Rock Mechanics as a Multidisciplinary Science*, Roegiers (ed.), Balkema, Rotterdam.
16. Teufel, L. W., and Rhett, W., "Geomechanical evidence for shear failure of chalk during production of the Ekofisk field", SPE 22755 presented at the 1991 SPE 66$^{th}$ Annual Technical Conference and Exhibition, Dallas, Oct. 6–9.
17. Chou, C. C., Pagano, N. J., "Elasticity, Tensor, Dyadic, and Engineering Approaches", Dover Publications, Inc., New York, 1967.
18. Budynas, R. G., "Advanced Strength and Applied Stress Analysis: Second Edition", McGraw-Hill Book Co., 1999.
19. Nactache, P. F. N., "A fully implicit thermal simulator", SPE 37985 presented at the SPE Reservoir Simulation Symposium, September 1997.
20. Aziz, K., Settari, A., "Petroleum Reservoir Simulation", Applied Science Publ., New York City (1979).
21. Terzaghi, K., "Erdbaumechanik auf bodenphysikalischer Grundlage", Franz Deuticke, Vienna, 1925.
22. Davies, J. P., Davies, D. K., "Stress-dependent permeability: characterization and modeling", SPE 56813 presented at the 1999 SPE Annual Technical Conference and Exhibition held in Houston, Tex., 3–6 Oct., 1999.
23. Yale, D. P., Crawford, B., "Plasticity and permeability in carbonates: dependence on stress path and porosity", SPE/ISRM 47582, presented at the SPE/ISRM Eurock '98 Meeting, Trondheim, Norway, 8–10 Jul., 1998.
24. Appleyard, J. R., Cheshire, I. M., "Nested factorization", SPE 12264 presented at the SPE Reservoir Simulation Symposium, San Francisco, Nov. 15–18, 1983.
25. Settari, A., Mourits, F. M., "A coupled reservoir and geomechanical simulation system", SPE 50939, SPE Journal, 219–226, September, 1998.
26. ABAQUS Theory Manual, Hibbitt, Karlsson & Sorensen, Inc., 1995.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of determining subsidence in a reservoir, said subsidence resulting from a continual withdrawal of hydrocarbon deposits and other fluids from said reservoir, comprising the steps of:

(a) estimating rock displacement parameters u, v, and w representing rock movement in the x, y, and z directions;

(b) determining $\epsilon_{x,y,z}$ ('x,y,z elongation strains') and $\gamma_{xy,yz,zx}$ ('shear strains') from the rock displacement parameters u, v, and w;

(c) determining $\sigma_{x,y,z}$ ('elastic normal rock stress in x,y,z directions') and $\tau_{xy,yz,zx}$ ('elastic shear stress') from the $\epsilon_{x,y,z}$ and $\gamma_{xy,yz,zx}$;

(d) solving a set of rock momentum balance differential equations from the $\sigma_{x,y,z}$ and the $\tau_{xy,yz,zx}$ and determining if any residuals exist, the rock displacement parameters u, v, and w representing accurate rock displacement parameters for said reservoir when the residuals are substantially equal to zero; and (e) determining said subsidence in said reservoir from said accurate rock displacement parameters determined from step (d), by solving a final set of failure criterion equations, which comprise the residuals and any derivatives, to determine a set of rock plastic displacements, said rock plastic displacements forming a part of said rock displacement parameters u, v, and w.

2. The method of claim 1, wherein the determining step (b) comprises the step of:

determining said $\epsilon_{x,y,z}$ (the 'x,y,z elongation strains') and said $\gamma_{xy,yz,zx}$ (the 'shear strains') from said rock displacement parameters u, v, and w by using the following equations:

$$\varepsilon_x = \frac{\partial u}{\partial x}$$

$$\varepsilon_y = \frac{\partial v}{\partial y}$$

$$\varepsilon_z = \frac{\partial w}{\partial z}$$

$$\gamma_{xy} = \frac{\partial u}{\partial y} + \frac{\partial v}{\partial x}$$

$$\gamma_{yz} = \frac{\partial v}{\partial z} + \frac{\partial w}{\partial y}$$

$$\gamma_{zx} = \frac{\partial w}{\partial x} + \frac{\partial u}{\partial z}$$

3. The method of claim 2, wherein the determining step (c) comprises the step of:

determining said $\sigma_{x,y,z}$ (the 'elastic normal rock stress in x,y,z directions') and said $\tau_{xy,yz,zx}$ (the 'elastic shear stress') from said $\epsilon_{x,y,z}$ and $\gamma_{xy,yz,zx}$ by using the following equations:

$$\sigma_x = 2G\epsilon_x + \lambda(\epsilon_x + \epsilon_y + \epsilon_z)$$

$$\sigma_y = 2G\epsilon_y + \lambda(\epsilon_x + \epsilon_y + \epsilon_z)$$

$$\sigma_z = 2G\epsilon_z + \lambda(\epsilon_x + \epsilon_y + \epsilon_z)$$

$$\tau_{xy} = G\gamma_{xy}$$

$\tau_{yz} = G\gamma_{yz}$ $\tau_{zx} = G\gamma_{zx}$.

4. The method of claim 3, wherein the solving step (d) comprises the steps of:

solving said set of rock momentum balance differential equations from said $\sigma_{x,y,z}$ and said $\tau_{xy,yz,xz}$, wherein said rock momentum balance differential equations have a left-hand side on a left side of an equal sign and a right-hand side on a right side of said equal sign, said rock momentum balance differential equations including, $$\frac{\partial \sigma_x}{\partial x} + \frac{\partial \tau_{yx}}{\partial y} + \frac{\partial \tau_{zx}}{\partial z} + F_x + P_x = 0$$

$$\frac{\partial \sigma_y}{\partial y} + \frac{\partial \tau_{xy}}{\partial x} + \frac{\partial \tau_{zy}}{\partial z} + F_y + P_y = 0$$

$$\frac{\partial \sigma_z}{\partial z} + \frac{\partial \tau_{xz}}{\partial x} + \frac{\partial \tau_{yz}}{\partial y} + F_z + P_z = 0$$

said rock displacement parameters u, v, and w estimated in step (a) representing said accurate rock displacement parameters for said reservoir when a left-hand side of said rock momentum balance differential equations substantially equal a right hand side of said rock momentum balance differential equations.

5. The method of claim 4, wherein the solving step (e) comprises the steps of using the said $\sigma_{x,y,z}$ and said $\tau_{xy,yz,xz}$ to determine whether a failure criterion has been exceeded in one of a set of staggered grids.

6. The method of claim 5, wherein, when said failure criterion has been exceeded in said one of said set of staggered grids, the solving step (e) further comprises the step of:

setting up a final set of equations, each equation being a failure criterion approximately equal to zero, and determining a set of parameters up, vp, wp which are plastic displacements resulting from a failure of the rock, said plastic displacements forming a part of said subsidence and being determined from said accurate rock displacement parameters for said reservoir.

7. A program storage device readable by a machine, tangibly embodying a program of instructions executable by the machine to perform method steps for determining subsidence in a reservoir, said subsidence resulting from a continual withdrawal of hydrocarbon deposits and other fluids from said reservoir, said method steps comprising:

(a) estimating rock displacement parameters u, v, and w representing rock movement in the x, y, and z directions;

(b) determining $\epsilon_{x,y,z}$ ('x,y,z elongation strains') and $\gamma_{xy,yz,zx}$ ('shear strains') from the rock displacement parameters u, v, and w;

(c) determining $\sigma_{x,y,z}$ ('elastic normal rock stress in x,y,z directions') and $\tau_{xy,yz,xz}$ ('elastic shear stress') from the $\epsilon_{x,y,z}$ and $\gamma_{xy,yz,zx}$;

(d) solving a set of rock momentum balance differential equations from the $\sigma_{x,y,z}$ and the $\tau_{xy,yz,xz}$ and determining if any residuals exist, the rock displacement parameters u, v, and w representing accurate rock displacement parameters for said reservoir when the residuals are substantially equal to zero; and (e) determining said subsidence in said reservoir from said accurate rock displacement parameters determined from step (d), by solving a final set of failure criterion equations, which comprise the residuals and any derivatives, to determine a set of rock plastic displacements, said rock plastic displacements forming a part of said rock displacement parameters u, v, and w.

8. The program storage device of claim 7, wherein the determining step (b) comprises the step of:

determining said $\epsilon_{x,y,z}$ (the 'x,y,z elongation strains') and said $\gamma_{xy,yz,zx}$ (the 'shear strains') from said rock displacement parameters u, v, and w by using the following equations:

$$\varepsilon_x = \frac{\partial u}{\partial x}$$

$$\varepsilon_y = \frac{\partial v}{\partial y}$$

$$\varepsilon_z = \frac{\partial w}{\partial z}$$

$$\gamma_{xy} = \frac{\partial u}{\partial y} + \frac{\partial v}{\partial x}$$

$$\gamma_{yz} = \frac{\partial v}{\partial z} + \frac{\partial w}{\partial y}$$

$$\gamma_{zx} = \frac{\partial w}{\partial x} + \frac{\partial u}{\partial z}.$$

9. The program storage device of claim 8, wherein the determining step (c) comprises the step of:

determining said $\sigma_{x,y,z}$ (the 'elastic normal rock stress in x,y,z directions') and said $\tau_{xy,yz,xz}$ (the 'elastic shear stress') from said $\epsilon_{x,y,z}$ and $\gamma_{xy,yz,zx}$ by using the following equations:

$\sigma_x = 2G\epsilon_x + \lambda(\epsilon_x + \epsilon_y + \epsilon_z)$ $\sigma_y = 2G\epsilon_y + \lambda(\epsilon_x + \epsilon_y + \epsilon_z)$ $\sigma_z = 2G\epsilon_z + \lambda(\epsilon_x + \epsilon_y + \epsilon_z)$ $\tau_{xy} = G\gamma_{xy}$ $\tau_{yz} = G\gamma_{yz}$ $\tau_{zx} = G\gamma_{zx}$.

10. The program storage device of claim 9, wherein the solving step (d) comprises the steps of:

solving said set of rock momentum balance differential equations from said $\sigma_{x,y,z}$ and said $\tau_{xy,yz,xz}$, wherein said rock momentum balance differential equations have a left-hand side on a left side of an equal sign and a right-hand side on a right side of said equal sign, said rock momentum balance differential equations including, $$\frac{\partial \sigma_x}{\partial x} + \frac{\partial \tau_{yx}}{\partial y} + \frac{\partial \tau_{zx}}{\partial z} + F_x + P_x = 0$$

$$\frac{\partial \sigma_y}{\partial y} + \frac{\partial \tau_{xy}}{\partial x} + \frac{\partial \tau_{zy}}{\partial z} + F_y + P_y = 0$$

$$\frac{\partial \sigma_z}{\partial z} + \frac{\partial \tau_{xz}}{\partial x} + \frac{\partial \tau_{yz}}{\partial y} + F_z + P_z = 0$$

said rock displacement parameters u, v, and w estimated in step (a) representing said accurate rock displacement parameters for said reservoir when a left-hand side of said rock momentum balance differential equations substantially equal a right hand side of said rock momentum balance differential equations.

11. The program storage device of claim 10, wherein the solving step (e) comprises the steps of using the said $\sigma_{x,y,z}$ and said $\tau_{xy,yz,xz}$ to determine whether a failure criterion has been exceeded in one of a set of staggered grids.

12. The program storage device of claim 11, wherein, when said failure criterion has been exceeded in said one of said set of staggered grids, the solving step (e) further comprises the step of:

setting up a final set of equations, each equation being a failure criterion approximately equal to zero, and determining a set of parameters up, vp, wp which are plastic displacements resulting from a failure of the rock, said plastic displacements forming apart of said subsidence and being determined from said accurate rock displacement parameters for said reservoir.

\* \* \* \* \*